(12) United States Patent
Yamazaki

(10) Patent No.: US 11,043,851 B2
(45) Date of Patent: *Jun. 22, 2021

(54) ELECTRONIC DEVICE AND ITS OPERATION SYSTEM

(71) Applicant: SEMICONDUCTOR ENERGY LABORATORY CO., LTD., Atsugi (JP)

(72) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,852

(22) Filed: Dec. 4, 2019

(65) Prior Publication Data

US 2020/0112203 A1  Apr. 9, 2020

Related U.S. Application Data

(63) Continuation of application No. 15/628,837, filed on Jun. 21, 2017, now Pat. No. 10,530,189, which is a
(Continued)

(51) Int. Cl.
*H02J 50/20* (2016.01)
*H02J 7/00* (2006.01)
(Continued)

(52) U.S. Cl.
CPC .............. *H02J 50/20* (2016.02); *G06F 1/26* (2013.01); *H02J 7/0047* (2013.01); *H02J 7/025* (2013.01);
(Continued)

(58) Field of Classification Search
CPC .. H02J 50/20; H02J 7/342; H02J 7/025; H02J 50/40; H02J 7/0047; H02J 7/00034;
(Continued)

(56) References Cited

U.S. PATENT DOCUMENTS 5,596,567 A    1/1997  DeMuro et al.
5,778,325 A    7/1998  Lindell et al.
(Continued)

FOREIGN PATENT DOCUMENTS

CN    102055039 A    5/2011
JP    10-307898 A    11/1998
(Continued)

*Primary Examiner* — Vuthe Siek
(74) *Attorney, Agent, or Firm* — Nixon Peabody LLP; Jeffrey L. Costellia

(57) ABSTRACT

An electronic device earned around by the user is desired to be used for a long period. In order to achieve this, a high-capacity battery may be incorporated. Since a high-capacity battery is large, its incorporation in an electronic device increases the weight of the electronic device. An electronic device used while being implanted in the body of the user, provided with an emergency power supply, is provided, in an electronic device provided with a plurality of batteries, a transmitting portion and a receiving portion conduct wireless charging among different batteries, and the battery to be charged or used is selected by a power supply management circuit depending on the circumstances.

10 Claims, 9 Drawing Sheets

Related U.S. Application Data continuation of application No. 14/601,269, filed on Jan. 21, 2015, now Pat. No. 9,711,994.

(51) Int. Cl.

| | | |
|---|---|---|
| *H02J 7/34* | (2006.01) | |
| *H02J 7/02* | (2016.01) | |
| *H02J 50/40* | (2016.01) | |
| *H04B 5/00* | (2006.01) | |
| *G06F 1/26* | (2006.01) | |
| *H02J 5/00* | (2016.01) | |

(52) U.S. Cl.
CPC .............. *H02J 7/342* (2020.01); *H02J 50/40* (2016.02); *H04B 5/0031* (2013.01); *H04B 5/0037* (2013.01); *H02J 5/005* (2013.01); *H02J 7/00034* (2020.01)

(58) Field of Classification Search
CPC .... H02J 5/005; H02J 50/00; H02J 7/34; H02J 7/02; H02J 7/00; H04B 5/0031; H04B 5/0037; H04B 5/00; G06F 1/26
See application file for complete search history.

(56) References Cited

U.S. PATENT DOCUMENTS

| | | | |
|---|---|---|---|
| 5,963,012 A | 10/1999 | Garcia et al. | |
| 6,127,799 A | 10/2000 | Krishnan | |
| 6,223,990 B1 | 5/2001 | Kamei | |
| 6,509,217 B1 | 1/2003 | Reddy | |
| 6,737,302 B2 | 5/2004 | Arao | |
| 6,791,457 B2 | 9/2004 | Shimura | |
| 6,837,438 B1 | 1/2005 | Takasugi et al. | |
| 7,181,164 B2 | 2/2007 | Lee et al. | |
| 7,274,168 B2 | 9/2007 | Tskukamoto et al. | |
| 7,471,062 B2 | 12/2008 | Bruning | |
| 7,479,346 B1 | 1/2009 | Chow et al. | |
| 7,705,565 B2 | 4/2010 | Patino et al. | |
| 7,843,169 B1 | 11/2010 | Tsukamoto et al. | |
| 2002/0049714 A1 | 4/2002 | Yamazaki et al. | |
| 2003/0231001 A1 | 12/2003 | Bruning | |
| 2004/0128246 A1 | 7/2004 | Takayama et al. | |
| 2004/0145454 A1 | 7/2004 | Powell et al. | |
| 2004/0160213 A1 | 8/2004 | Stanesti et al. | |
| 2005/0012842 A1 | 1/2005 | Miyagawa et al. | |
| 2005/0162131 A1 | 7/2005 | Sennami et al. | |
| 2005/0194926 A1 | 9/2005 | Di Stefano | |
| 2005/0215119 A1 | 9/2005 | Kaneko | |
| 2005/0254183 A1 | 11/2005 | Ishida et al. | |
| 2006/0009251 A1 | 1/2006 | Noda et al. | |
| 2006/0284593 A1 | 12/2006 | Nagy et al. | |
| 2007/0241199 A1 | 10/2007 | Yamazaki et al. | |
| 2008/0058029 A1 | 3/2008 | Sato et al. | |
| 2008/0210762 A1 | 9/2008 | Osada et al. | |
| 2010/0060664 A1 | 3/2010 | Kilpatrick, II et al. | |
| 2010/0110623 A1* | 5/2010 | Koyama | H01L 27/1225 361/679.01 |
| 2011/0101913 A1 | 5/2011 | Matsumoto et al. | |
| 2011/0260681 A1 | 10/2011 | Guccione et al. | |
| 2012/0319483 A1 | 12/2012 | Scruggs et al. | |
| 2013/0020875 A1 | 1/2013 | Wozniak et al. | |
| 2013/0099757 A1 | 4/2013 | Ham | |
| 2014/0097786 A1 | 4/2014 | Grimes et al. | |
| 2014/0266033 A1 | 9/2014 | Jeong et al. | |
| 2014/0285134 A1 | 9/2014 | Kim et al. | |
| 2015/0015195 A1 | 1/2015 | Leabman et al. | |
| 2015/0062525 A1 | 3/2015 | Hirakata | |

FOREIGN PATENT DOCUMENTS

| | | |
|---|---|---|
| JP | 2000-090220 A | 3/2000 |
| JP | 2001-067446 A | 3/2001 |
| JP | 2002-291175 A | 10/2002 |
| JP | 2003-006592 A | 1/2003 |
| JP | 2003-070187 A | 3/2003 |
| JP | 2003-299255 A | 10/2003 |
| JP | 2003-309490 A | 10/2003 |
| JP | 2004-135135 A | 4/2004 |
| JP | 2004-343410 A | 12/2004 |
| JP | 2005-149238 A | 6/2005 |
| JP | 2005-316724 A | 11/2005 |
| JP | 2005-352434 A | 12/2005 |
| JP | 2006-004015 A | 1/2006 |
| JP | 2006-032927 A | 2/2006 |
| JP | 2007-166763 A | 6/2007 |
| JP | 2011-101458 A | 5/2011 |

* cited by examiner 5101  5103  5102  5100

5201
5203
5202
5200

ELECTRONIC DEVICE AND ITS OPERATION SYSTEM

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or their manufacturing methods. In particular, one embodiment of the present invention relates to an electronic device and its operation system.

Note that electronic devices in this specification generally mean devices including secondary batteries; and electro-optical devices including secondary batteries, information terminals including secondary batteries, and the like are all electronic devices.

2. Description of the Related Art

Electronic devices carried around by the users and electronic devices worn by the users have been actively developed.

Since electronic devices carried around by the users and electronic devices worn by the users are powered by batteries, their power consumption is reduced as much as possible. Particularly in the case where a central processing unit (CPU), which consumes a lot of power for its operation, is included in the electronic device, processing of the CPU greatly affects the power consumption of the electronic device.

A semiconductor device including a high-performance integrated circuit (e.g., a CPU) on a plastic or plastic film substrate, which transmits and receives electric power or signals wirelessly, is described in Patent Document 1.

REFERENCE

Patent Document

[Patent Document 1] Japanese Published Patent Application No. 2006-32927

SUMMARY OF THE INVENTION

An electronic device carried around by the user is desired to be used For a long period. In order to achieve this, a high-capacity battery may be incorporated. Since a high-capacity battery is large in size, its incorporation in an electronic device increases the weight of the electronic device. Thus, small-sized, high-capacity batteries that can be incorporated in portable electronic devices are developed. Note that in this specification, the expression "incorporated in electronic devices" refers not only to incorporation of a battery in a manner that the battery cannot be detached for replacement, but also to incorporation of a battery in a manner that the battery as a form of battery pack or the like can be freely detached.

The detail of the power consumption of an electronic device including a CPU will be described. The power consumption can be roughly classified into power consumed by a CPU, power consumed by systems around the CPU, and power consumed by a plurality of input/output devices and peripheral devices connected to the inside or outside of the electronic device. The power consumed by systems around the CPU includes a loss in a converter, a loss in a wiring pattern, and power consumed by a bus, a controller, and the like.

When an electronic device is reduced in size or thickness, a battery is also subjected to the limitation. As for a battery, however, decrease in volume leads to decrease in capacity. Thus, a circuit, a battery, and the like are stored in a smaller space.

Furthermore, a battery generates heat by charge and discharge, which may thermally affect the surrounding area.

As an electronic device is reduced in size and a circuit, a battery, and the like are stored in a smaller space, how to control the power consumption and heat generation becomes a problem.

An electronic device having a novel structure, specifically, an electronic device having a novel structure that can be changed in form in various ways is provided. More specifically, a wearable electronic device that is used while being worn on the body and an electronic device that is used while being implanted in the body are provided.

Particularly in the case where a battery of an electronic device that is used while being implanted m the body is broken or exhausted for some reason, the user may suffer serious damage.

Therefore, an electronic device carried around by the user, a wearable electronic device used while being worn on the body of the user, and an electronic device used while being implanted in the body of the user, each provided with an emergency power supply, are provided.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A battery is provided for each of the components used for an electronic device, whereby an electronic device having a plurality of power supplies is obtained. In the electronic device having a plurality of power supplies, an operation system by which only the component to be used is selectively driven is employed, whereby power consumption can be reduced.

In addition, the electronic device includes a power supply management circuit (power supply monitoring circuit) for managing the plurality of power supplies.

A structure disclosed in this specification is an electronic device including a central processing unit, a display unit, and a receiving unit. The central processing unit includes a first battery and a first receiving portion. The first receiving portion has a function of wirelessly charging the first battery. The display unit includes a second battery and a second receiving portion. The second receiving portion has a function of wirelessly charging the second battery. The receiving unit includes a third battery and a third receiving portion. The third receiving portion has a function of wirelessly charging the third battery.

An electronic device may be capable of transmission and reception among a plurality of batteries. Another structure disclosed in this specification is an electronic device including a central processing unit, a display unit, a receiving unit, a transmitting unit, and a power supply management circuit. The central processing unit includes a first battery, a first receiving portion, and a first transmitting portion. The first receiving portion has a function of wirelessly charging the first battery. The display unit includes a second battery, a second receiving portion, and a second transmitting portion. The second receiving portion has a function of wirelessly charging the second battery. The receiving unit includes a third battery, a third receiving portion, and a third transmitting portion. The third receiving portion has a function of wirelessly charging the third battery. The power supply management circuit has a function of wirelessly charging the second battery or the third battery with electric power of the first battery via the first transmitting portion.

Note that a circuit is connected to each of the batteries to enable wireless charging. At least secondary batteries are electrically connected to respective wireless receiving portions via respective regulators.

A regulator is an electronic circuit that keeps an output voltage or current constant. A regulator is classified into two kinds, a linear regulator and a switching regulator, depending on the amount of electric load or the like. A switching regulator is also called a DC-DC converter.

Furthermore, a transmitting portion that is capable of charging a battery with electric power of another battery may be provided for each of the batteries. The power supply management circuit that manages the amount of electric power of each battery acquires the data on the remaining amount of electric power of each battery regularly or constantly, and controls the amount of electric power as appropriate.

Taking an information terminal such as a cell-phone and a smartphone having a single power supply for example, when the single power supply is turned off, all of the functions of the device stop. When the power supply is on, even a functional circuit that is not in use consumes small electric power because it is in a standby state. If there is a functional circuit that is not in use, the electrical connection between the functional circuit not in use and the battery may be off to save the power consumption. For example, in the case where only a still image is displayed on a display portion of an information terminal, the connection between a CPU and a battery for the CPU is turned off in order that the CPU not in use is turned off. Then, only a battery for a circuit that is driven to display the still image on the display portion in use is used. In that case, the CPU of this information terminal is not operating although the still image is displayed, and the power consumption of the CPU can apparently be regarded as zero.

In this manner, by an operation system that appropriately selects and controls, from a plurality of batteries in an electronic device, a battery that corresponds to a component to be used, a battery to be used is determined and the power consumption of the other batteries not in use is suppressed. Thus, a period for which the information terminal can be used on a single charge can be extended. A structure of the present invention related to the operation system is an operation system including a first battery, a second battery, a third battery, and a power supply management circuit that manages the first to third batteries. The power supply management circuit wirelessly supplies electric power from the first battery to the second battery or the third battery. Alternatively, an operation system may include a first battery, a second battery, a third battery, and a control unit that manages the first to third batteries, and may wirelessly charge the first battery, the second battery, and the third battery at a time.

Furthermore, the power supply management circuit may operate such that electric power is supplied to a battery connected to a function to be used from the other batteries connected to the other functions not in use. Owing to the operation system that appropriately selects, from a plurality of batteries in an electronic device, a battery corresponding to a component to be used and adjusts the amount of electric power of each battery, a period for which the function to be used can be used can be extended. In addition, if any of the batteries is secured as an emergency power supply by the power supply management circuit, the electronic device can be used in emergency. For a cell-phone or the like, for example, an image is displayed on the display portion when the power supply is turned on; accordingly, if there is not enough electric power to display an image on the display portion, a phone call cannot be made in some cases. In the case where the electronic device has a plurality of batteries one of which is secured as an emergency power supply by the power supply management circuit and the emergency power supply is available only for a communication function while electric power supply to the display portion is in an off state, a phone call can be made without displaying an image on the display portion.

Furthermore, if small-sized batteries are dotted in the electronic device and an exterior body of the device is made of a flexible material, a flexible device having a complex external shape can be obtained.

Furthermore, if a wearable electronic device that is used while being worn on the body is dotted with small-sized batteries inside, a feeling of weight can be reduced its compared to an electronic device having a single large battery. In addition, even if the individual small-sized battery generates heat, it does not ruin the comfort of wearing the device.

Furthermore, if an artificial organ is dotted with small-sized batteries inside the electronic device, freedom of shapes can be provided. In addition, if the exterior body is made of a flexible material, a flexible artificial organ can be obtained. In the case where a flexible artificial organ is manufactured, use of a plurality of batteries rather than a single battery enables design of a structure that can be bent easily. In addition, an artificial organ with a thinner external shape or a smaller artificial organ, than an artificial organ with a single battery, can be manufactured. In addition, if each of the plurality of batteries dotted in the artificial organ can be wirelessly charged, the number of regular removals and implantations of an artificial organ before the battery runs down can be reduced.

Furthermore, after an artificial organ such as a pacemaker or an artificial car is implanted under the skin, the portion where the artificial organ is implanted gets swollen, and the skin is unnaturally stretched. Many users worry about such appearance. Therefore, the thickness of an artificial organ is preferably small, even if the area is large. Providing an artificial organ with small-sized batteries dotted about inside in order that the portion where the artificial organ is implanted is prevented from being swollen is helpful.

Furthermore, since the breakage or drain of the battery of an artificial organ for some reason may cause serious damage to the user, it is helpful for the artificial organ to have an emergency power supply. It is desirable that a plurality of batteries be provided in an artificial organ and that a power supply management circuit for managing the batteries use a battery available to transmit an emergency signal or the like to the exterior (e.g., the user's information terminal). Determination of whether or not a battery has an abnormality is difficult. In the case where an artificial organ determines to set a certain battery as an emergency power supply, if the battery becomes unavailable, the meaning of the emergency power supply may be lost. It is helpful if a power supply management circuit identifies a battery with an abnormality, stops power supply from the battery, selects another battery as an emergency power supply, and transmits an emergency signal or the like. In other words, selecting batteries to be used, depending on the circumstances, by the power supply management circuit is helpful. Of course, the user can select batteries to be used, by giving instruction to the power supply management circuit.

Furthermore, in the case where a single large-sized battery is used for an electronic device having a curved surface or complex shape, the placement of the battery is limited, and the large-sized battery may deteriorate the design. For a wearable electronic device such as a thin electronic device that is used while being wrapped around the arm, in particular, bending a large-sized battery is difficult. If a plurality of small-sized batteries are dotted in a thin electronic device that is used while being wrapped around the arm, the individual small-sized battery can be incorporated in the thin electronic device without being bent. In addition, since a wearable electronic device is close to the skin, a large-sized battery that generates heat may bring discomfort to the user. However, if small-sized batteries are dotted about, the amount of heat per one battery can be suppressed. In addition, if small-sized batteries are dotted about, the risk of explosion and the like can be suppressed: therefore, the safety is higher than the case where a huge-sized battery is used.

In the case where the user carries around and drops an electronic device having only a single large-sized battery, breakage of the battery makes all the functions of the electronic device unavailable. In the case where a plurality of small-sized batteries are included, even if one of them is broken, some of the functions are still available as long as at least one of the small-sized batteries can be used. In this manner, in an electronic device including a plurality of small-sized batteries, each of which is used for a different component, some of its functions are available even if some of its functions are broken. Thus, an electronic device that hardly becomes out of order can be obtained.

Furthermore, even when one of the small-sized batteries is broken or its amount of electric power becomes zero, another battery can be used as a substitute, owing to the power supply management circuit, which makes it possible for the electronic device to be used continuously. Furthermore, even when the amount of electric power of one of the small-sized batteries becomes zero, it can be wirelessly charged with electric power supplied from a transmitting portion connected to another battery, owing to the power supply management circuit. In this manner, the electronic device can be used for a long period. In other words, an electronic device having a power supply management circuit that enables mutual supply of electric power among a plurality of batteries can be obtained.

A battery is a device that deteriorates as the number of charges increases. Owing to the power supply management circuit adjusting the number of charges or selecting batteries to be used, the usage period of batteries can be extended. In addition, by monitoring the degree of deterioration of batteries by the power supply management circuit and appropriately selecting batteries to be used depending on the degree of deterioration by the power supply management circuit, the usage period of the electronic device can be extended.

It is preferable that at least one of the plurality of small-sized batteries provided in the electronic device be a secondary battery that can be wirelessly charged.

As the secondary battery, one or more kinds selected from the following can be used: a lithium ion secondary battery such as a lithium polymer battery, a lithium ion capacitor, an electric double layer capacitor, and a redox capacitor. The electronic device includes an antenna wirelessly receiving electric power and a control means supplying the received electric power to a functional circuit.

The antenna included in the electronic device constitutes a communication module that realizes a wireless charging function. The communication module may use a charging method corresponding to a standard such as Qi or Powermat. At the time of charging, a plurality of batteries may be charged at a time. The antenna included in the electronic device may constitute a communication module that realizes a near field wireless communication function.

A MEMS can be combined with the electronic device dotted with small-sized batteries inside. For example, an electronic device including a small-sized battery for supplying electric power to a sensor using MEMS and a detection circuit, a small-sized battery for supplying electric power to a CPU, and a small-sized battery for supplying electric power to a memory storing data detected by the sensor can be obtained.

In the case where a plurality of kinds of sensors are included in an electronic device, since a battery is provided for each component to be used, the user can selectively attach the sensor the user wants to use or detach the sensor. For example, if a control circuit that can control sensors such as a pulse sensor, a temperature sensor, a positional information sensor (e.g., a GPS), an acceleration sensor, and an angular velocity sensor, and a connection portion (a connection socket) to connect the sensor and the control circuit are provided in an electronic device, which is used while being wrapped around the arm, the user can select the sensor depending on the function the user wants to use, and the sensor may be connected to the electronic device. In that case, each of the sensors has a small-sized battery and a regulator, and the larger number of functions are used, the larger number of small-sized batteries are connected. Thus, an electronic device having a plurality of small-sized batteries is obtained.

If a transistor using an oxide semiconductor layer (also referred to as an OS transistor) is used for a regulator, reduction in power consumption can be achieved since the off-state current is small. In particular, a regulator (DC-DC converter) including a control circuit including OS transistors can operate at a temperature of 150° C. or higher. Thus, such a DC-DC converter is preferably used for an electronic device that is likely to operate at high temperatures.

An oxide semiconductor used for the oxide semiconductor layer to be a channel formation region of the OS transistor preferably contains at least indium (In) or zinc (Zn). In particular, In and Zn are preferably contained. A stabilizer for strongly bonding oxygen is preferably contained in addition to In and Zn. As a stabilizer, at least one of gallium (Ga), tin (Sn), zirconium (Zr), hafnium (Hf), and aluminum (Al) may be contained.

As another stabilizer, one or plural kinds of lanthanoid such as lanthanum (La), cerium (Ce) praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor film used for the OS transistor, for example, any of the following oxides can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

If an oxide semiconductor film used for a channel formation region contains a large amount of hydrogen, the hydrogen and the oxide semiconductor are bonded to each other, so that part of the hydrogen serves as a donor and causes generation of an electron which is a carrier. As a result, the threshold voltage of the transistor shifts in the negative direction. It is therefore preferable that after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Accordingly, it is preferable that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density which is $1\times10^{17}/cm^3$ or lower, $1\times10^{16}/cm^3$ or lower, $1\times10^{15}/cm^3$ or lower, $1\times10^{14}/cm^3$ or lower, $1\times10^{13}/cm^3$ or lower, lower than $8\times10^{11}/cm^3$, or lower than $1\times10^{11}/cm^3$. The lower limit of a carrier density is $1\times10^{-9}/cm^3$ or higher.

Thus, the transistor including an i-type or substantially i-type oxide semiconductor film can have extremely favorable off-state current characteristics. For example, the off-state drain current of the transistor including the oxide semiconductor film can be $1\times10^{-18}$ A or less, preferably $1\times10^{-21}$ A or less, more preferably $1\times10^{-24}$ A or less at room temperature (approximately 25° C.), or $1\times10^{-15}$ A or less, preferably $1\times10^{-18}$ A or less, more preferably $1\times10^{-21}$ A or less at 85°C. An off state of a transistor refers to a state where a gate voltage is much lower than the threshold voltage in an n-channel transistor. Specifically, the transistor is in an off state when the gate voltage is lower than the threshold voltage by 1 V or more, 2 V or more, or 3 V or more.

An oxide semiconductor which is formed may include a non-single-crystal, for example. An oxide semiconductor may include CAAC, for example. Note that an oxide semiconductor including CAAC is referred to as a CAAC-OS (c-axis aligned crystalline oxide semiconductor). The CAAC-OS may include a plurality of crystal parts in which c-axes are aligned in a direction parallel to a normal vector of a surface where the CAAC-OS is formed or a normal vector of a surface of the CAAC-OS.

An electronic device with a plurality of power supplies, in which a battery is provided for each of components to be used, also has a characteristic operation system. For example, the operation system includes a first battery, a second battery, a third battery, and a control unit that controls the first to third batteries, and can wirelessly charge the first to third batteries at a time. Furthermore, the operation system includes at least a plurality of power supplies (e.g., secondary batteries) and a control unit such as a CPU, and the control unit manages electric power of the plurality of power supplies. The number of control unit of the electronic device is not limited to one, and may be the same as the number of the plurality of power supplies.

Furthermore, an operation system of an electronic device with a plurality of power supplies includes a first battery, a second battery, a third battery, and a power supply management circuit that manages the first to third batteries, and the first battery wirelessly supplies electric power to the second battery or the third battery. The power supply management circuit monitors the amount of electric power of each battery, and can charge one battery with electric power wirelessly supplied from another battery automatically or by operation of the user as appropriate.

An electronic device having a plurality of batteries and a power supply management circuit that enables mutual supply of electric power among the plurality of batteries can be provided. In that case, by replacing one of the plurality of batteries, the other batteries can be charged without replacement. In addition, it is also possible to wirelessly charge one of the plurality of batteries from an external source, then stop the charge from the external source by the power supply management circuit, and wirelessly charge the other batteries inside the electronic device. Through repetition of the above, all the plurality of batteries can be fully charged.

The electronic device is provided with a battery for each of the components to be used, and the operation system selectively drives only the component to be used, whereby power consumption can be reduced. Thus, an electronic device having a novel structure can be provided. Note that the description of these effects does not preclude the existence of other effects. One embodiment of the present invention does not necessarily achieve all the effects listed above. Other effects will be apparent from arid can be derived from the description of the specification, the drawings, the claims, and the like.

BRIEF DESCRIPTION OF THE DRAWINGS

In the accompanying drawings.

DETAILED DESCRIPTION OF THE INVENTION

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limit ed to description of the embodiments.

Embodiment 1

In this embodiment, an example of a device such as a portable information terminal will be described below.

Figure 1:
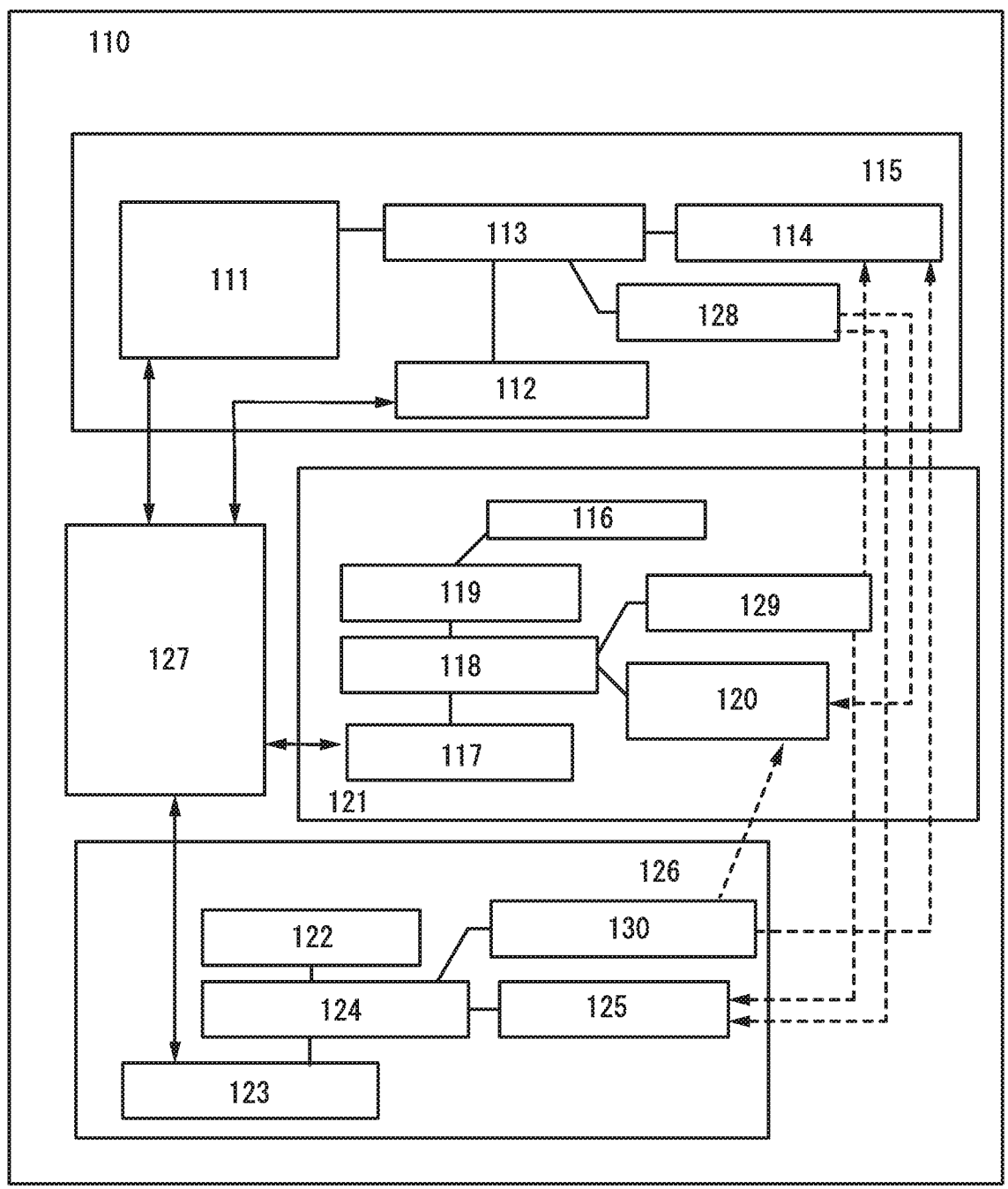
FIG. 1 is a block diagram illustrating one embodiment of the present invention.

FIG. 1 is a block diagram of a device 110.

The device 110 of this embodiment includes a control module 115, a display module 121, a communication module 126, and a power supply management circuit 127. The control module 115 is a controller that controls the entire device 110, communication, and display of information on a display portion 116.

The control module 115 includes a CPU 111, a battery 112, a regulator 113, a wireless receiving portion 114, and a wireless transmitting portion 128.

The display module 121 includes the display portion 116, a display driver circuit 119, a battery 117, a regulator 118, a wireless receiving portion 120, and a wireless transmitting portion 129. Although an example in which the device 110 includes the display portion 116 is shown in FIG. 1, this embodiment is not limited thereto, and another functional portion such as a sensor portion can be provided in place of the display portion 116.

The communication module 126 includes a communication circuit 122, a battery 123, a regulator 124, a wireless receiving portion 125, and a wireless transmitting portion 130.

Each module includes a regulator and a battery. Each regulator produces electric power or a signal necessary for the respective functional circuit with the use of the electric power of the connected battery, and supplies the electric power or signal to the functional circuit. In addition, the regulator can prevent overcharge and the like when the battery is charged. Although an example in which a wireless receiving portion and a wireless transmitting portion are connected to one regulator is shown in FIG. 1, a regulator connected to a wireless receiving portion and a regulator connected to a wireless transmitting portion may be separately provided.

In the device 110, the power supply management circuit 127 enables electric power of the batteries in different modules to be mutually supplied. In addition, the power supply management circuit 127 monitors the amount of electric power of the batteries 112, 117, and 123, and can charge one of the batteries with electric power wirelessly supplied from another battery automatically or by operation of the user as appropriate.

In the device 110, each of the modules can be turned on or turned off independently. The operation system that selectively drives only the module to be used can reduce power consumption of the device 110.

For example, when the user looks at information on the display portion 116 without using a communication function, the communication circuit 122 is in an off state where the battery 123 is not used in order that electric power to the communication circuit 122 is blocked in the communication module 126, while the display module 121 and the control module 115 are in an on state.

Furthermore, for a still image, once the still image is displayed on the display portion 116 with the display module 121 and the control module 115 being in an on slate, the still image can be kept displayed while only the display module 121 is in an on state even after the control module 115 is turned off with the still image being displayed. Note that when transistors of the display portion 116 use an oxide semiconductor layer with low off-state current (e.g., an oxide material including In, Ga, and Zn), or when the display portion 116 includes a memory for each of the pixels, the still image can be kept displayed for a certain period even when the supply of electric power from the battery 117 is blocked after the still image is displayed.

In this embodiment, an example in which the display module 121, the control module 115, and the communication module 126 each have a battery is described; however, the total number of batteries is not limited to three. The electronic device may additionally include functional modules and their batteries, in which case the electronic device has four or more batteries in total.

Figure 2:
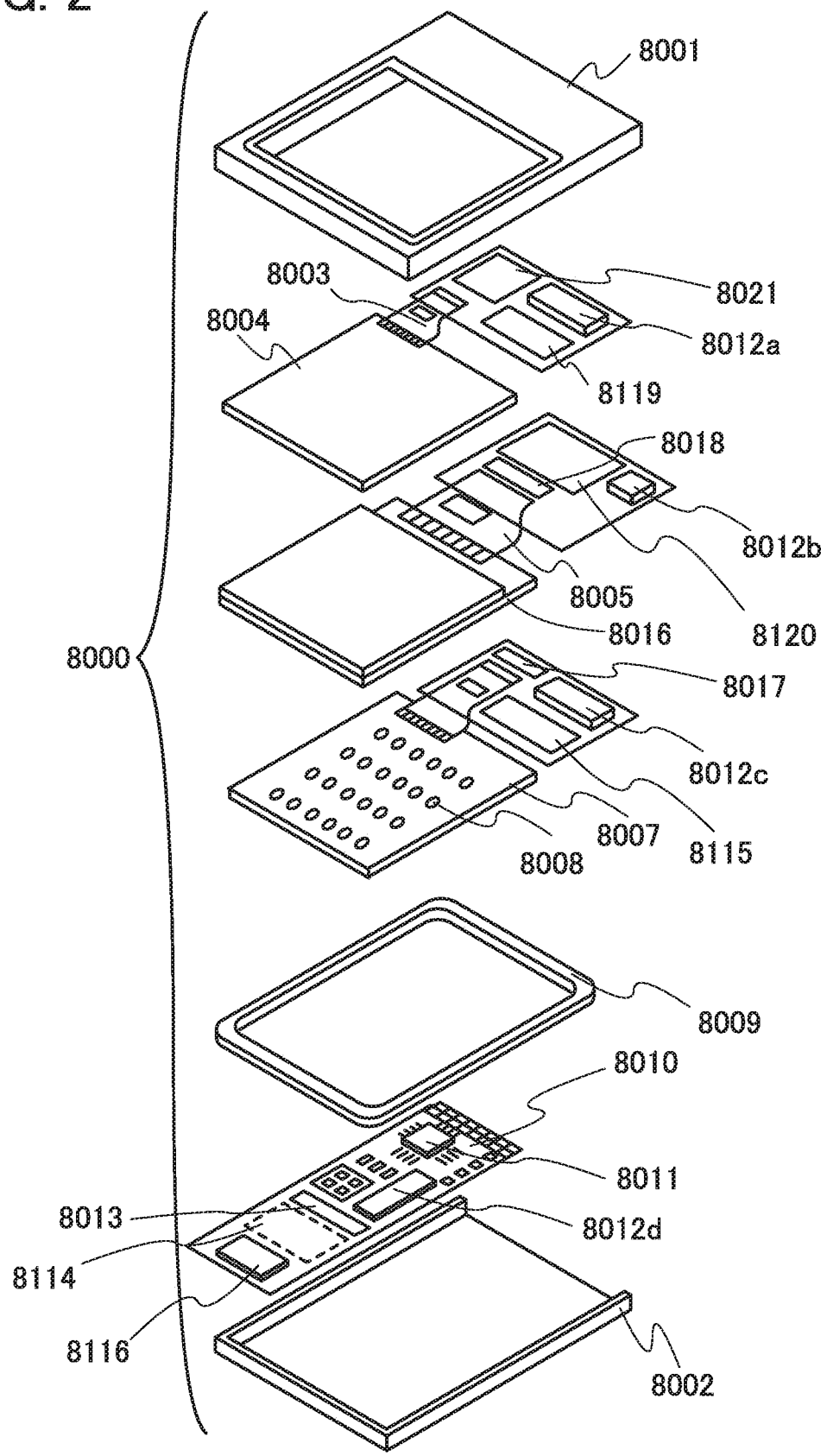
FIG. 2 illustrates an electronic device of one embodiment of the present invention.

As an example of an electronic device, an information terminal including four batteries is shown in FIG. 2.

In an electronic device 8000 illustrated in FIG. 2, a touch panel 8004 connected to an FPC 8003, a display panel 8016 connected to an FPC 8005, a backlight unit 8007, a frame 8009, a printed board 8010, a CPU 8011, a power supply management circuit 8116, and batteries 8012a, 8012b, 8012c, and 8012d are provided between an upper cover 8001 and a lower cover 8002.

The shapes and sizes of the upper cover 8001 and the lower cover 8002 can be changed as appropriate in accordance with the sizes of the touch panel 8004 and the display panel 8016.

The touch panel 8004 can be a resistive touch panel or a capacitive touch panel and may be formed so as to overlap with the display panel 8016. A counter substrate (sealing substrate) of the display panel 8016 can have a touch panel function. A photosensor may be provided in each pixel of the display panel 8016 so that, an optical touch panel is obtained. The touch panel 8004 is connected to a printed board via the FPC 8003, and the printed board includes the battery 8012a, a regulator 8021, a transmitting and receiving portion 8119, and the like. Note that a transmitting portion and a receiving portion may be separately provided and may share some circuits and wirings, although they are shown as one component, i.e., the transmitting and receiving portion 8119 for simplicity in this embodiment. The transmitting and receiving portion 8119 includes an antenna for wireless charge or an antenna for wireless transmission, and electric power is wirelessly supplied from an external source to the battery 8012a via the regulator, whereby the battery 8012a is charged. The touch panel 8004 is driven mainly with the use of the battery 8012a. In addition, in response to the instruction of the power supply management circuit 8116, electric power of the battery 8012a is transmitted via the transmitting and receiving portion 8119 to another battery to charge the battery.

The display panel 8016 is an active matrix liquid crystal display module, and is connected to a printed board via the FPC 8005. The printed board includes the battery 8012b, a regulator 8018, a transmitting and receiving portion 8120, and the like. The transmitting and receiving portion 8120 includes an antenna for wireless charge or an antenna for wireless transmission, and electric power is wirelessly supplied from an external source to the battery 8012b via the regulator, whereby the battery 8012b is charged. The display panel 8016 displays an image on a display region mainly with the use of the battery 8012b. In addition, in response to the instruction of the power supply management circuit 8116, electric power of the battery 8012b is transmitted via the transmitting and receiving portion 8120 to another battery to charge the battery.

The backlight unit 8007 includes a light source 8008 such as an LED. Furthermore, the backlight unit 8007 is connected to a printed board via an FPC. The printed board includes the battery 8012c, a regulator 8017, a transmitting and receiving portion 8115, and the like. In addition, in response to the instruction of the power supply management circuit 8116, electric power of the battery 8012c is transmitted via the transmitting and receiving portion 8115 to another battery to charge the battery.

Note that although a structure in which the light source 8008 is provided over the backlight unit 8007 is illustrated in FIG. 2, one embodiment of the present invention is not limited to this structure. For example, a structure in which the light source 8008 is provided at an end portion of the backlight unit 8007 and a light diffusion plate is further provided may be employed.

Note that the backlight unit 8007 may not necessarily be provided in the ease where the display panel 8016 is a display device using an organic EL element or a reflective liquid crystal display device. The backlight unit 8007 is provided in the case of a transmissive liquid crystal display device or a transflective liquid crystal display device, for example.

Note that as the display panel 8016, a display element, a display device that is a device including a display element, a light-emitting clement, a light-emitting device that is a device including a light-emitting element, or the like can employ various modes and can include various elements. A display element, a display device, a light-emitting element, or a light-emitting device includes at least one of the following, for example: an electroluminescence (EL) clement (e.g., an EL clement including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL (registered trademark), an interferometric modulator display (IMOD) clement, a MEMS shutter display element, an optical-interference-type MEMS display element, an electro wetting element, a piezoelectric ceramic display, and a display element using a carbon nanotube. In addition to the above, a display medium whose contrast, luminance, reflectivity, transmittance, or the like changes by electrical or magnetic action may be included. Note that examples of display devices having EL elements include an EL display. Examples of display devices including electron emitters are a Held emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

In the display panel 8016, an active matrix method in which an active element is included in a pixel or a passive matrix method in which an active element is not included in a pixel can be used.

In an active matrix method, as an active clement (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

In the case where transistors are used in the display panel 8016 and the like, the transistors can be formed with the use of a variety of substrates. The type of a substrate is not limited to a certain type. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, a soda lime glass substrate, or the like can be given. Examples of a flexible substrate, an attachment film, a base material film, or the like are as follows: plastic typified by polyethylene terephthalate (PET), polyethylene naphthalate (PEN), and polyether sulfone (PES): a synthetic resin such as acrylic; polypropylene; polyester; polyvinyl fluoride; polyvinyl chloride; polyamide; polyimide; aramid; epoxy; an inorganic vapor deposition film; and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower powder consumption of the circuit or higher integration of the circuit.

Alternatively, a flexible substrate may be used as the substrate, and the transistor may be provided directly on the flexible substrate. Further alternatively, a separation layer may be provided between the substrate and the transistor. The separation layer can be used when pail or the whole of a semiconductor device formed over the separation layer is separated from the substrate and transferred onto another substrate. In such a case, the transistor can be transferred to a substrate having low heat resistance or a flexible substrate as well. For the above separation layer, a stack including inorganic films, which are a tungsten film and a silicon oxide film, or an organic resin film of polyimide or the like formed over a substrate can be used, for example.

In other words, a transistor may be formed using one substrate, and then transferred to another substrate. Examples of a substrate to which a transistor is transferred include, in addition to the above substrate over which the transistor can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, and a rubber substrate. When such a substrate is used, a transistor with excellent properties or a transistor with low power consumption can be formed, a device with high durability, high heat resistance can be provided, or reduction in w eight or thickness can be achieved.

In the case where transistors are used in the display panel 8016 and the like, transistors with a variety of configurations can be used. There is no limitation on the type of transistors. For example, a transistor including a single-crystal silicon or a non-single-crystal semiconductor film typified by amorphous silicon, polycrystalline silicon, microcrystalline (also referred to as microcrystal, nanocrystal, or semi-amorphous) silicon, or the like can be used as a transistor. Alternatively, a thin film transistor (TFT) whose semiconductor film is thinned can be used. In the case of using the TFT, there are various advantages. For example, since the TFT can be formed at temperature lower than that of the case of using single-crystal silicon, manufacturing cost can be reduced or a manufacturing apparatus can be made larger. Since the manufacturing apparatus is made larger, the TFT can be formed using a large substrate. Therefore, many display devices can be formed at the same time at low cost. In addition, a substrate having low heat resistance can be used because of low manufacturing temperature. Therefore, the transistor can be formed using a light-transmitting substrate. Alternatively, transmission of light in a display element can be controlled by using the transistor formed using the light-transmitting substrate. Alternatively, part of a film included in the transistor can transmit light because the thickness of the transistor is small. Therefore, the aperture ratio can be improved.

Note that when a catalyst (e.g., nickel) is used in the case of forming polycrystalline silicon, crystallinity can be further improved and a transistor having excellent electric characteristics can be formed. Accordingly, a gate driver circuit (e.g., a scan line driver circuit), a source driver circuit (e.g., a signal line driver circuit), and a signal processing circuit (e.g., a signal generation circuit, a gamma correction circuit, or a DA converter circuit) can be formed using the same substrate as a pixel portion.

Note that when a catalyst (e.g., nickel) is used in the case of forming microcrystalline silicon, crystallinity can be further improved and a transistor having excellent electric characteristics can be formed. In this case, crystallinity can be improved by just performing heat treatment without performing laser irradiation. Accordingly, a gate driver circuit (e.g., a scan line driver circuit) and part of a source driver circuit (e.g., an analog switch) can be formed over the same substrate. Note that when laser irradiation for crystallization is not performed, unevenness in crystallinity of silicon can be suppressed. Therefore, high-quality images can be displayed. Note that it is possible to manufacture polycrystalline silicon or microcrystalline silicon without a catalyst (e.g., nickel).

Note that although preferably, crystallinity of silicon is improved to poly crystal, microcrystal or the like in the whole panel, the present invention is not limited to this. Crystallinity of silicon may be improved only in part of the panel. Selective increase in crystallinity can be achieved by selective laser irradiation or the like. For example, only a peripheral driver circuit region excluding pixels may be irradiated with laser light. Alternatively, only a region of a gate driver circuit, a source driver circuit, or the like may be irradiated with laser light. Alternatively, only part of a source driver circuit (e.g., an analog switch) may be irradiated with laser light. Accordingly, crystallinity of silicon can be improved only in a region in which a circuit needs to be operated at high speed. Since a pixel region is not particularly needed to be operated at high speed, even if crystallinity is not improved, the pixel circuit can be operated without problems. Thus, a region whose crystallinity is improved is small, so that manufacturing steps can be decreased. Thus, throughput can be increased and manufacturing cost can be reduced. Alternatively, since the number of necessary manufacturing apparatus is small, manufacturing cost can be reduced.

As the transistors, for example, transistors including a compound semiconductor (e.g., SiGe, and GaAs) or an oxide semiconductor (e.g., Zn—O, In—Ga—Zn—O, In—Zn—O (IZO (registered trademark)). In—Sn—O (ITO), Sn—O, Ti—O, Al—Zn—Sn—O (AZTO), In—Sn—Zn—O (ITZO (registered trademark)) can be used. Alternatively, a thin film transistor obtained by thinning any of the compound semiconductors or the oxide semiconductors can be used. Since manufacturing temperature can be lowered, such a transistor can be formed at room temperature, for example. Accordingly, the transistor can be formed directly on a substrate having low heat resistance, such as a plastic substrate or a film substrate. Note that such a compound semiconductor or an oxide semiconductor can be used not only for a channel portion of the transistor but also for other applications. For example, such a compound semiconductor or an oxide semiconductor can be used for a wiring, a resistor, a pixel electrode, a light-transmitting electrode, or the like. Since such an element can be formed at the same time as the transistor, cost can be reduced.

Note that for example, a transistor or the like formed by an inkjet method or a printing method can be used as a transistor. Accordingly, a transistor can be formed at room temperature, can be formed at a low vacuum, or can be formed using a large substrate. Therefore, the transistor can be formed without use of a mask (reticle), so that the layout of the transistor can be easily changed. Alternatively, since the transistor can be formed without use of a resist, material cost is reduced and the number of steps can be reduced. Furthermore, since a film can be formed where needed, a material is not wasted as compared to a manufacturing method by which etching is performed after the film is formed over the entire surface; thus, costs can be reduced.

Note that for example, a transistor or the like including an organic semiconductor or a carbon nanotube can be used as a transistor. Accordingly, such a transistor can be formed using a substrate which can be bent. A device including a transistor which includes an organic semiconductor or a carbon nanotube can resist a shock.

In the case where transistors are used in circuits included in the display module 121, the control module 115, the communication module 126, the electronic device 8000, and the like, transistors with a variety of other configurations can be used. For example, a MOS transistor, a junction transistor, a bipolar transistor, or the like can be used as a transistor. By using a MOS transistor as a transistor, the size of the transistor can be reduced. Thus, a large number of transistors can be mounted. By using a bipolar transistor as a transistor, a large amount of current can flow. Thus, a circuit can be operated at high speed. Note that a MOS transistor and a bipolar transistor may be formed over one substrate. Thus, reduction in power consumption, reduction in size, high speed operation, and the like can be realized.

Alternatively, for example, a transistor with a multi-gate structure having two or more gate electrodes can be used as a transistor. With the multi-gate structure, a structure where a plurality of transistors are connected in series is provided because channel regions are connected in series. Thus, with the multi-gate structure, the amount of off-state current can be reduced and the withstand voltage of the transistor can be increased (the reliability can be improved). Alternatively, with the multi-gate structure, drain-source current does not change much even if drain-source voltage changes when the transistor operates in a saturation region, so that a flat slope of voltage-current characteristics can be obtained. By utilizing the flat slope of the voltage-current characteristics, an ideal current source circuit or an active load having an extremely large resistance can be realized. Accordingly, a differential circuit, a current mirror circuit, or the like having excellent properties can be realized.

Note that a transistor with a structure where gate electrodes are formed above and below a channel can be used, for example. With the structure where the gate electrodes are formed above and below the channel, a circuit structure where a plurality of transistors are connected in parallel is provided. Thus, a channel region is increased, so that the amount of current can be increased. Alternatively, by using the structure where gate electrodes are formed above and below the channel, a depletion layer can be easily formed, so that subthreshold swing can be improved.

Note that as a transistor, for example, it is possible to use a transistor with a structure where a gate electrode is formed above a channel region, a structure where a gate electrode is formed below a channel region, a staggered structure, an inverted staggered structure, a structure where a channel region is divided into a plurality of regions, a structure where channel regions are connected in parallel or in series, or the like. A transistor with any of a variety of structures such as a planar type, a FIN-type, a Tri-Gate type, a top-gate type, a bottom-gate type, a double-gate type (with gates above and below a channel), and the like can be used.

The frame 8009 has a function of protecting the display panel 8016. The frame 8009 can also function as a radiator plate. Furthermore, the frame 8009 may incorporate an antenna of any of the receiving portions.

A control unit includes over the printed board 8010 the CPU 8011, the battery 8012d, a regulator 8013, a transmitting and receiving portion 8114, and a signal processing circuit for outputting a video signal and a clock signal. Although an example in which the power supply management circuit 8116 is provided over the same printed board 8010 is shown, this embodiment is not limited thereto. The CPU 8011 may have the same function as the power supply management circuit 8116 and be formed into one chip. For the power supply management circuit 8116 that monitors and manages a plurality of batteries, a power supply to supply the electric power thereto may be separately provided; however, in this embodiment, the battery 8012d provided over the same printed board 8010 serves as the main power supply of the power supply management circuit 8116. Furthermore, the amount of electric power of the batteries 8012a, 8012b, and 8012c provided over the other printed board is monitored by the power supply management circuit 8116 through wireless communication using the transmitting and receiving portion 8114, and the batteries 8012a, 8012b, and 8012c can be used as the auxiliary power supplies. For example, when the remaining amount of electric power of the battery 8012d is reduced, electric power from the batteries 8012a, 8012b, and 8012c may be wirelessly transmitted to the battery 8012d, whereby the battery 8012d is charged.

At the time of charging from an external source (e.g., a charger), the transmitting and receiving portions may receive electric power at a time. When an electronic device is wirelessly charged, the electronic device is not always charged smoothly depending on how the electronic device is placed on the charger or how the electronic device and the charger are positioned. Since the electronic device 8000 has a plurality of transmitting and receiving portions, if the positions of the transmitting and receiving portions are scattered, any one of the transmitting and receiving portions can receive electric power regardless of how the electronic device 8000 is placed on the charger. As long as any one of the transmitting and receiving portions can receive electric power and one battery is charged, the other battery or batteries can be charged with electric power from the charged one battery, owing to the power supply management circuit 8116. As a result, all the batteries can be fully charged.

Since the electronic device 8000 is an information terminal, it has a communication module as a communication function. That is, the communication module that realizes a wireless charging function is incorporated. Furthermore, the electronic device 8000 may incorporate a communication module that realizes a near field wireless communication function, which enables a phone call to be made. In that case, the communication module may also include a battery. The electronic device 8000 can include another function such as a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), and a microphone.

One printed board is used for each of the functional circuits, and regulators and batteries are incorporated in order that an optimal power output corresponding to each of the functional circuits is possible. In addition, the distance between the battery and the functional circuit is close, and a lead wiring can be short, which can reduce power consumption.

Although an example in which one printed board is used for each of the functions and a plurality of printed boards are used in total is shown in FIG. 2, this embodiment is not limited thereto. AH the functional circuits may be provided over one printed board, in which case a plurality of batteries are provided over the one printed board. A plurality of functions may be provided over one printed board, and at that time, a single battery instead of a plurality of batteries may be provided. Each of the display panel 8016, the touch panel 8004, and the backlight unit 8007 in FIG. 2 is electrically connected to the control unit via a wiring cord or an FPC not shown in FIG. 2. Furthermore, since the electronic device 8000 in FIG. 2 has the transmitting and receiving circuit and the like over each of the printed boards, the printed boards need not be connected with each other via wirings or the like for driving. Since wireless communication and wireless charge are possible among the circuits, arrangement of wiring cords and design of connectors can be simplified, which can improve the degree of freedom in design.

Furthermore, the electronic device 8000 may further be provided with a slot for insertion of a SIM card, a connector portion for connecting a USB device such as a USB memory.

As described above, in the electronic device 8000, a battery is provided for each of the units (modules or functions) to be used, and a plurality of power supplies are managed by the power supply management circuit 8116. The electronic device 8000 having a plurality of power supplies is provided with the operation system that selectively drives only the function to be used, whereby power consumption can be reduced. In addition, the power supply management circuit 8116 monitors the amount of electric power of each battery, and can charge one battery with electric power wirelessly supplied from another battery automatically or by operation of the user as appropriate. Owing to the operation system that appropriately selects, from the plurality of batteries in the electronic device, a battery corresponding to a component to be used, and adjusts the amount of electric power of each battery; a period for which the function to be used can be used can be extended.

Furthermore, each of the batteries is provided with a communication module that realizes a wireless charging function, and charging of the plurality of batteries at a time can be performed. In addition, the transmitting and receiving portion is included and the power supply management circuit can adjust the amount of electric power; therefore, mutual supply of electric power among the batteries is possible.

Although an example in which the electronic device 8000 has a box-like shape is described in this embodiment, one embodiment of the invention is not limited thereto.

The electronic device may have a complex shape. In the ease where an electronic device with a complex shape is manufactured, a plurality of small-sized batteries are placed in predetermined places as appropriate, whereby the degree of freedom in design of the electronic device can be increased.

Embodiment 2

Figure 3A:
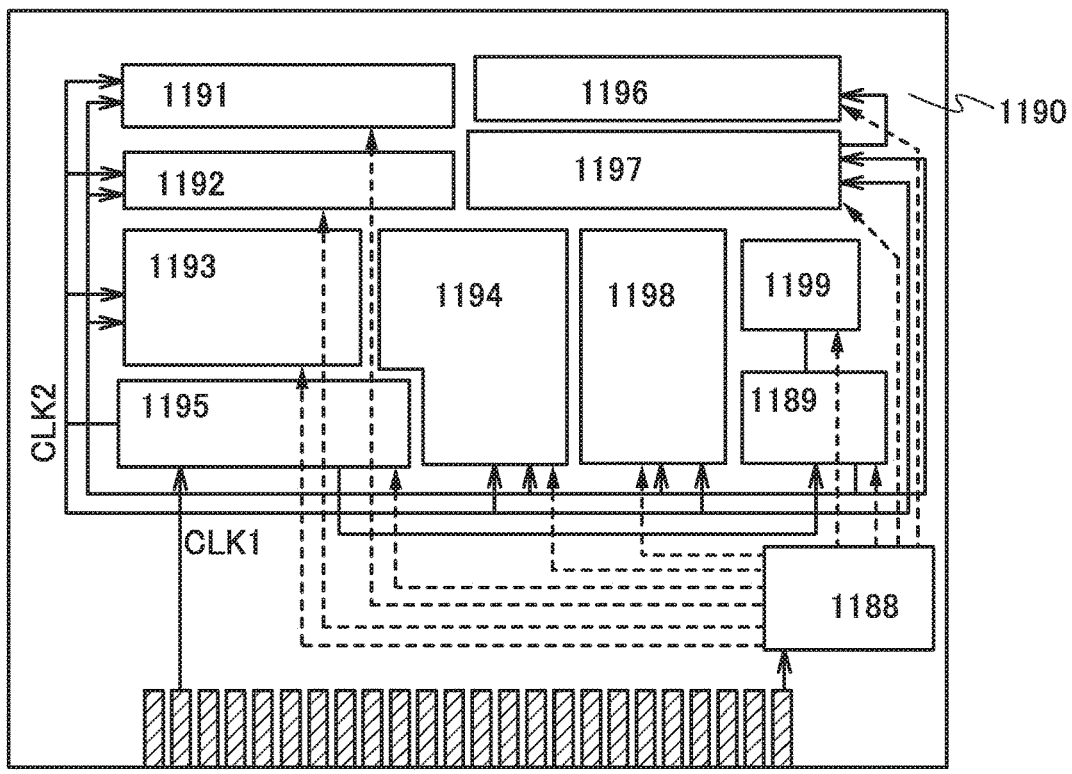
FIGS. 3A to 3C are block diagrams each illustrating one embodiment of the present invention.

In Embodiment 1, an example of an electronic device in which a battery, a wireless receiving portion, and a CPU are mounted on one printed board and a plurality of printed boards are provided is described. In Embodiment 2, an example in which a regulator 1188 is formed over a substrate 1190 with a CPU, and a small battery is connected to the CPU via the regulator 1188 will be described. The regulator 1188 produces electric power or a signal necessary for each functional circuit from a connected power supply (e.g., a battery) and supplies the electric power or signal. FIG. 3A shows an example in which the regulator 1188 and the CPU are formed over the substrate 1190.

The CPU will be described below.

FIG. 3A is a block diagram illustrating a specific structure of a CPU. The CPU illustrated in FIG. 3A includes an arithmetic logic unit (ALU) 1191, an ALU controller 1192, an instruction decoder 1193, an interrupt controller 1194, a timing controller 1195, a register 1196, a register controller 1197, a bus interface (Bus I/F) 1198, a rewritable ROM 1199, and an ROM interface (ROM I/F) 1189 over a substrate 1190. A semiconductor substrate, an SOI substrate, a glass substrate, or the like is used as the substrate 1190. The ROM 1199 and the ROM interface 1189 may each be provided over a separate chip. Obviously, the CPU illustrated in FIG. 3A is only an example in which the structure is simplified, and an actual CPU has various structures depending on the application.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 processes an interrupt request From an external input/output device or a peripheral circuit depending on its priority or a mask state. The register controller 1197 generates an address of the register 1196, and reads/writes data from/to the register 1196 depending on the state of the CPU.

The timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator for generating an internal clock signal CLK2 on the basis of a reference clock signal CLK1, and supplies the internal clock signal CLK2 to the above circuits.

In the CPU illustrated in FIG. 3A, a memory cell is provided in the register 1196. A memory cell including a transistor using an oxide semiconductor layer can be used as the memory cell of the register 1196.

In the CPU illustrated in FIG. 3A, the register controller 1197 selects an operation of holding data in the register 1196 in accordance with an instruction from the ALU 1191. That is, the register controller 1197 selects whether data is held by a flip-flop or by a capacitor in the memory cell included in the register 1196. When data holding by the flip-flop is selected, a power supply voltage is supplied to the memory cell in the register 1196. When data holding by the capacitor is selected, the data is rewritten in the capacitor, and supply of power supply voltage to the memory cell in the register 1196 can be stopped.

Figure 3B:
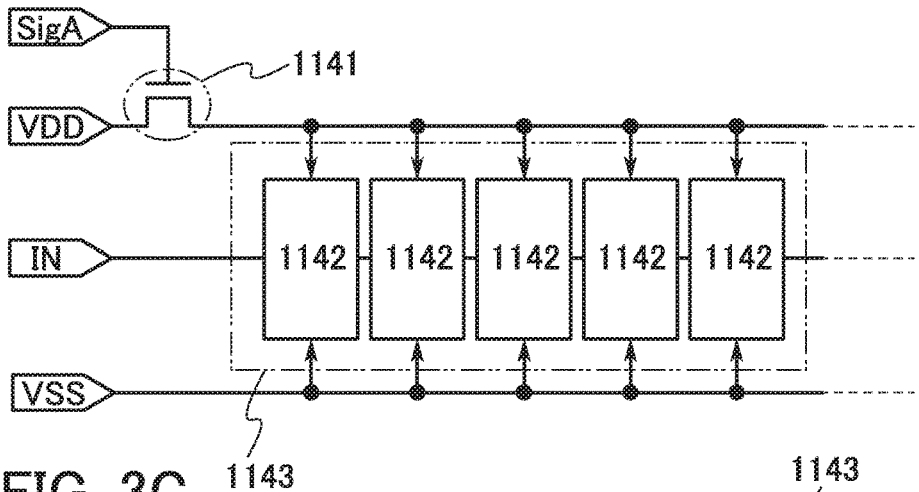
Figure 3C:
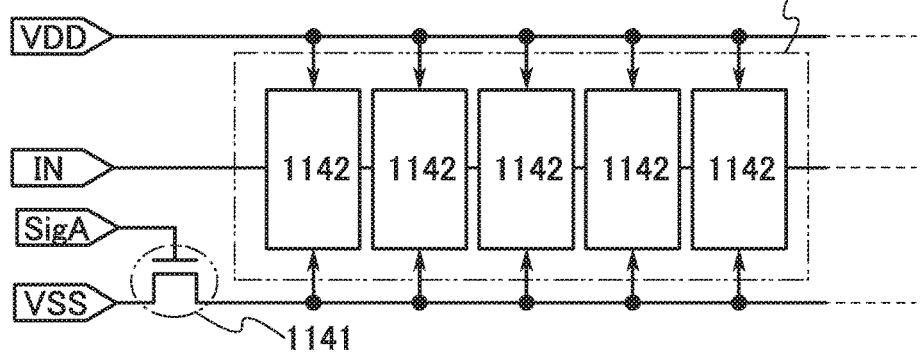

The power supply can be stopped by providing a switching element between a memory cell group and a node to which a power supply potential VDD or a power supply potential VSS is supplied, as illustrated in FIG. 3B or FIG. 3C. Circuits illustrated in FIGS. 3B and 3C are described below.

FIGS. 3B and 3C each illustrate an example of a configuration of a memory circuit including a transistor including an oxide semiconductor layer as a switching element for controlling supply of a power supply potential to a memory cell.

The memory device illustrated in FIG. 3B includes a switching element 1141 and a memory cell group 1143 including a plurality of memory cells 1142. Each of the memory cells 1142 included in the memory cell group 1143 is supplied with the high-level power supply potential VDD via the switching element 1141. Furthermore, each of the memory cells 1142 included in the memory cell group 1143 is supplied with a potential of a signal IN and the low-level power supply potential VSS.

In FIG. 3B, a transistor using an oxide semiconductor layer is used as the switching element 1141, and the switching of the transistor is controlled by a signal Sig A supplied to a gate electrode layer thereof.

Note that FIG. 3B shows the structure in which the switching element 1141 includes only one transistor; however, without particular limitation thereon, the switching element 1141 may include a plurality of transistors. In the case where the switching element 1141 includes a plurality of transistors which serves as switching dements, the plurality of transistors may be connected to each other in parallel, in series, or in combination of parallel connection and serial connection.

Although the switching element 1141 controls the supply of the high-level power supply potential VDD to each of the memory cells 1142 included in the memory cell group 1143 in FIG. 3B., the switching element 1141 may control the supply of the low-level power supply potential VSS.

In FIG. 3C, an example of a memory device in which each of the memory cells 1142 included in the memory cell group 1143 is supplied with the low-level power supply potential VSS via the switching element 1141 is illustrated. The supply of the low-level power supply potential VSS to each of the memory cells 1142 included in the memory cell group 1143 can be controlled by the switching element 1141.

When a switching element is provided between a memory cell group and a node to which the power supply potential VDD or the power supply potential VSS is supplied, data can be held even in the case w here an operation of a CPU is temporarily stopped and the supply of the power supply voltage is stopped: accordingly, power consumption can be reduced. Specifically, for example, while the user of a personal computer does not input data to an input device such as a keyboard, the operation of the CPU can be stopped, so that the power consumption can be reduced.

Although the CPU is given as an example, the transistor can also be applied to an LSI such as a digital signal processor (DSP), a custom LSI, or a field programmable gate array (FPGA).

This embodiment can be freely combined with any of the other embodiments.

Embodiment 3

In this embodiment, electronic devices each of which is one embodiment of the present invention will be described with reference to FIGS. 4A to 4F.

FIGS. 4A to 4F illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 4A:
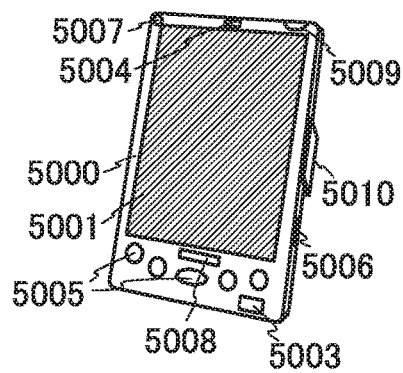
FIGS. 4A to 4F each illustrate an electronic device of one embodiment of the present invention.
Figure 4B:
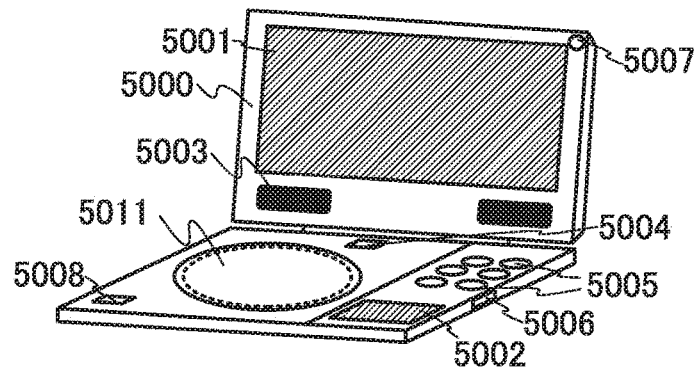
Figure 4C:
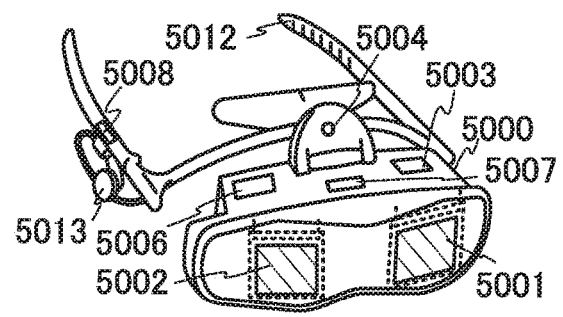
Figure 4D:
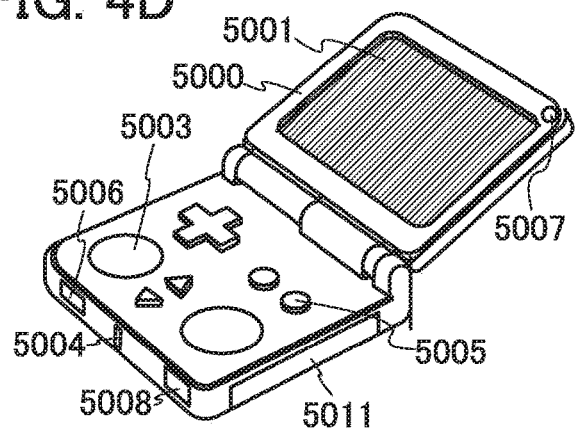
Figure 4E:
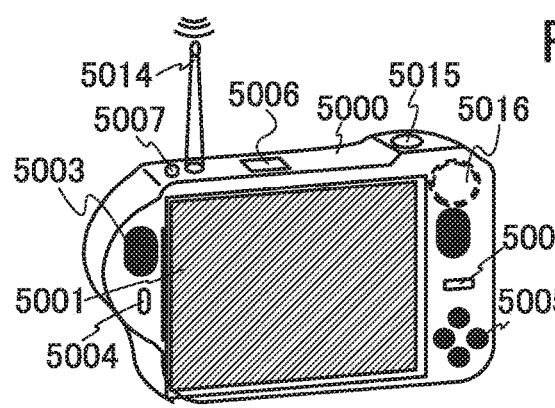
Figure 4F:
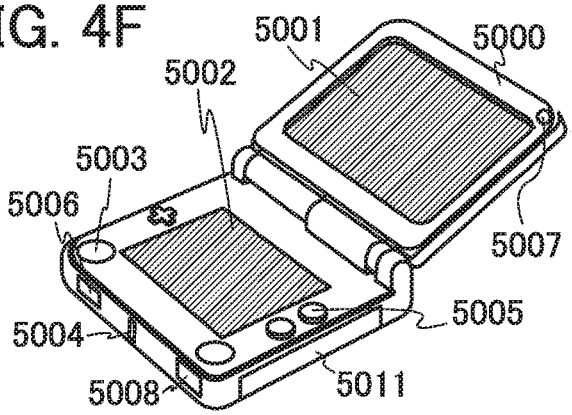

FIG. 4A shows a mobile computer, which can include a switch 5009, an infrared port 5010, and the like in addition to the above components. FIG. 4B shows a portable image reproducing device (e.g., a DVD reproducing device) provided with a memory medium, which can include a second display portion 5002, a memory medium reading portion 5011, and the like in addition to the above components. FIG. 4C shows a goggle-type display, which can include a second display portion 5002, a support portion 5012, an earphone 5013, and the like in addition to the above components. FIG. 4D shows a portable game machine, which can include the memory medium reading portion 5011 and the like in addition to the above components. FIG. 4E shows a digital camera having a television reception function, which can include an antenna 5014, a shutter button 5015, an image receiving portion 5016, and the like in addition to the above components. FIG. 4F shows a portable game machine, which can include the second display portion 5002, the memory medium reading portion 5011, and the like in addition to the above components.

The electronic devices illustrated in FIGS. 4A to 4F can have a variety of functions such as a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a recording medium and displaying die program or data on a display portion. Furthermore, the electronic device including a plurality of display portions can have a function of displaying image information mainly on one display portion while displaying text information on another display portion, a function of displaying a three-dimensional image by displaying images where parallax is considered oil a plurality of display portions, or the like. Furthermore, the electronic device including an image receiving portion can have a function of photographing a still image, a function of photographing a moving image, a function of automatically or manually correcting a photographed image, a function of storing a photographed image in a memory medium (an external memory medium or a memory medium incorporated in the camera), a function of displaying a photographed image on the display portion, or the like. Note that functions which can be provided for the electronic devices illustrated in FIGS. 4A to 4F are not limited to the above, and the electronic devices can have a variety of functions.

Each of the electronic devices described in this embodiment incorporates a plurality of batteries and has a wireless receiving portion capable of wireless charging. In addition, the electronic device has a power supply management circuit (including a power supply monitoring circuit) for managing the plurality of batteries. In addition, the electronic device has transmitting portions and receiving portions that perform wireless charging among different batteries, and the power supply management circuit selects the battery to be charged or used, depending on the circumstances.

Figure 5A:
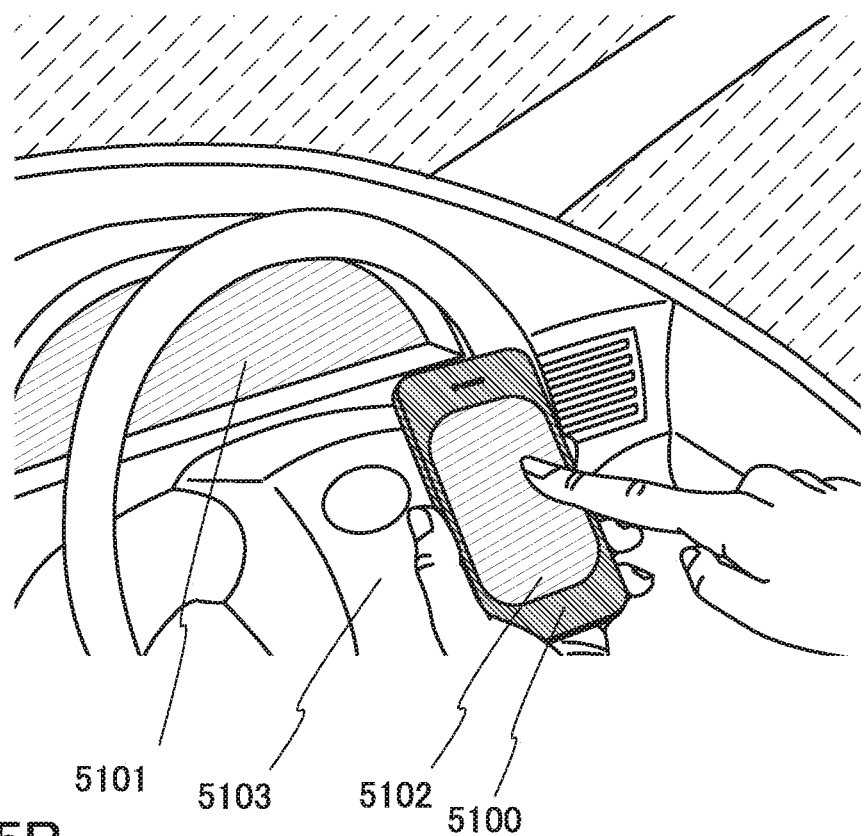
FIGS. 5A and 5B each illustrate an electronic device of one embodiment of the present invention.
Figure 5B:
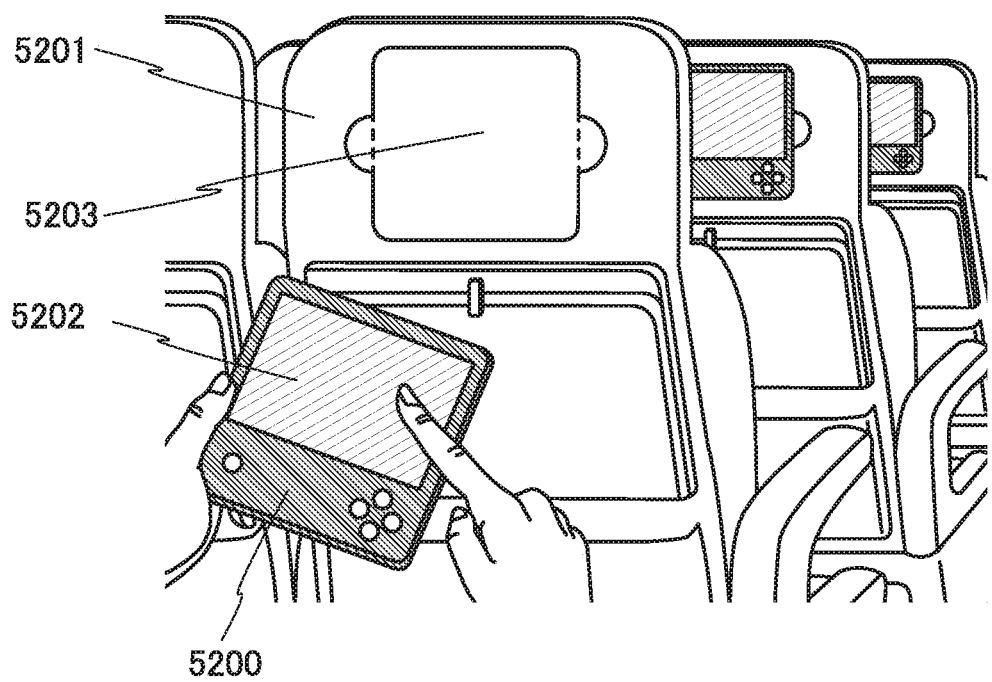

Usage examples of the electronic device are illustrated in FIGS. 5A and 5B.

FIG. 5A shows an example where an information terminal is operated in a moving object such as a car.

The numeral 5103 indicates a steering wheel, which includes an antenna inside. The antenna in the steering wheel 5103 can supply electric power to an electronic device 5100. The electronic device 5100 has a plurality of batteries, and at least one of the batteries is charged by wireless charging. The steering wheel 5103 may be provided with a jig that can fix the electronic device 5100. If the electronic device 5100 is fixed on the steering wheel 5103, the user can make a phone call or a video-phone call without using his/her hands. Furthermore, through voice authentication with the use of a microphone provided in the electronic device 5100, the car can be driven by a voice of the driver.

For example, by operating the electronic device 5100 while the car is parked, the positional information can be displayed on a display portion 5102. Furthermore, information not displayed on a display portion 5101 of the car, such as engine speed. steering wheel angle, temperature, and tire pressure may be displayed on the display portion 5102. The display portion 5102 has a touch input function. Furthermore, one or more cameras to image the outside of the car can be used to display the outside image on the display portion 5102. That is, the display portion 5102 can be used as a back monitor, for example. Furthermore, for preventing drowsy driving, the electronic device 5100 may operate as follows, for example: while wirelessly receiving information such as the driving speed from the car to monitor the driving speed, the electronic device 5100 images the driver at the time of driving and when a period for which the driver closes his/her eyes is long, it vibrates, beeps, or plays music (depending on the setting that can be selected by the driver as appropriate). Furthermore, by stopping imaging the driver while the car is parked, power consumption can be reduced. In addition, the batteries of the electronic device 5100 may be wirelessly charged while the car is parked.

The electronic device 5100 is expected to be used in a variety of ways in a moving object such as a car, as described above, and is desired to incorporate a number of sensors and a plurality of antennas that enable various functions thereof. Although a moving object such as a car has a power supply, the power supply is limited. As the electric power to drive the moving object is considered, it is preferable that the electric power used for the electronic device 5100 be as low as possible. For an electric vehicle, in particular, power consumed by the electronic device 5100 may decrease the travel distance. Even if the electronic device 5100 has a variety of functions, it is not often that all the functions are used at a time, and only one or two functions are usually used as necessary. In the case where the electronic device 5100 including a plurality of batteries, each of which is prepared for a different function, has a variety of functions, only the function to be used is turned on and electric power is supplied thereto from a battery corresponding to that function; whereby, power consumption can be reduced. Furthermore, batteries corresponding to the functions not in use, among the plurality of batteries, can be wirelessly charged from an antenna provided in the car.

FIG. 5B illustrates an example in which an information terminal is operated in an airplane or the like. Since a period in which an individual can use his/her own information terminal is limited in an airplane or the like, the airplane is desired to be equipped with information terminals that the passengers can use when the flight is long.

An electronic device 5200, having a display portion 5202 that displays images such as a movie, a game, and a commercial, is an information terminal with which the current flying location and the remaining flight time can be obtained in real time, owing to its communication function. The display portion 5202 has a touch input function.

The electronic device 5200 can be fit into a depressed portion in a scat 5201, and an antenna installation portion 5203 is provided in a position that overlaps with the electronic device 5200, whereby the electronic device 5200 can be wirelessly charged while it is fit into the depressed portion. Furthermore, the electronic device 5200 can function as a telephone or communication tool when the user is sick and wants to contact a flight attendant, for example. If the electronic device 5200 has a translation function, the user can communicate with a flight attendant by using the display portion 5202 of the electronic device 5200 even when the user and the flight attendant speak different languages. Furthermore, passengers seated next to one another who speak different languages can communicate by using the display portion 5202 of the electronic device 5200. In addition, the electronic device 5200 can function as a message board, displaying a message in English such as "please do not disturb" on the display portion 5202 while the user is asleep, for example.

The electronic device 5200 has a plurality of batteries each of which is for a different function, and only the function to be used is turned on while the other functions not in use are in an off state, whereby power consumption can be reduced. Furthermore, among the plurality of batteries, batteries corresponding to the functions not in operation can be wirelessly charged from the antenna installation portion 5203.

It is difficult to carry a dangerous object on an airplane. The electronic device 5200 having a plurality of small-sized batteries is highly safe, and even if one of the batteries explodes, the damage can be minimized. In addition, even if one battery becomes unavailable because of failure, explosion, or breakage, some of the functions of the electronic device can still be used by utilizing the other batteries.

The plurality of batteries of the electronic device 5200 provided over the plurality of scats may be designed such that they can be used in emergency when an airplane has an electrical problem. Since all the electronic devices 5200, each of which is provided for each of the plurality of scats, are the same products having the same design, a system may be constructed such that the electronic devices 5200 can be connected in series as an emergency power supply.

As the plurality of small-sized batteries of the electronic device 5200, one or more kinds selected from the following can be used: a lithium ion secondary battery such as a lithium polymer battery, a lithium ion capacitor, an electric double layer capacitor, and a redox capacitor.

The structure described in this embodiment can be used in appropriate combination with the structure described in any of the other embodiments.

Embodiment 4

In this embodiment, an example of an artificial organ will be described.

Figure 6:
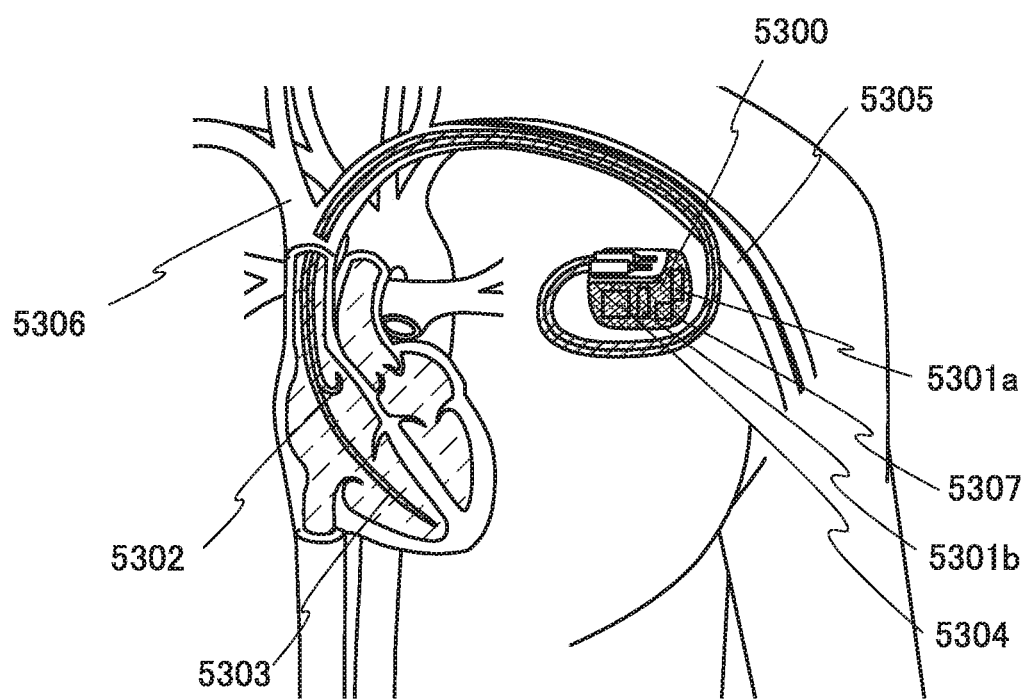
FIG. 6 illustrates an electronic device of one embodiment of the present invention.

FIG. 6 is a cross-sectional schematic view of an example of a pacemaker.

A pacemaker body 5300 includes at least batteries 5301a and 5301b, a regulator, a power supply management circuit 5307, a control circuit, an antenna 5304, a wire 5302 reaching a right atrium, and a wire 5303 reaching a right ventricle.

The pacemaker body 5300 is implanted in the body by surgery, and the two wires pass through a subclavian vein 5305 and a superior vena cava 5306 of the human body, with the end of one of which placed in the right ventricle and the end of the other of which placed in the right atrium.

The antenna 5304 can receive electric power, and the plurality of batteries 5301a and 5301b are charged with the electric power, which can reduce the frequency of replacing the pacemaker. Since the pacemaker body 5300 has a plurality of batteries, the safety is high, and even when one of the batteries fails, the other can function. In this manner, the plurality of batteries function as auxiliary power supplies. Furthermore, the power supply management circuit 5307 may set the battery 5301a as an emergency power supply and the other battery 5301b to be used mainly. In the case where the battery 5301b is broken or drained for some reason, it is desirable that an emergency signal or the like be transmitted to the external (e.g., an information terminal of the user, or a neighbor medical institution), with the use of the battery 5301a. Since the breakage or drain of the battery of a pacemaker for some reason may cause serious damage to the user, it is helpful for the pacemaker to have an emergency power supply. Furthermore, if the battery to be provided in the pacemaker is further divided into a plurality of thin batteries to be mounted on a printed board where control circuits including a CPU and the like are provided, the pacemaker body 5300 can be smaller in size and thickness.

In addition to the antenna 5304 that can receive electric power, an antenna that can transmit a physiological signal may be provided for the pacemaker. For example, a system that monitors the cardiac activity, capable of monitoring physiological signals such as pulses, respiratory rate, heart rate, and body temperature with an external monitoring device may be constructed.

If the pacemaker can be small in size and thickness according to this embodiment, a protrusion generated in the portion where the pacemaker body 5300 is implanted can be unnoticeably small.

Note that how the pacemaker is placed here is just an example, and it can be changed in various ways depending on the heart disease.

Furthermore, this embodiment is not limited to the pacemaker. An artificial ear is an artificial organ that is more widely used than the pacemaker. An artificial ear converts a sound into an electric signal and directly stimulates the auditory nerve with a stimulus device in the cochlea.

An artificial ear includes a first device implanted deep in the ear by surgery and a second device that picks up sounds with a microphone and sends them to the implanted first device. The first device and the second device are not electrically connected to each other, and transmission and reception between the two are conducted wirelessly. The first device includes at least an antenna that receives an electric signal converted from a sound and a wire that reaches the cochlea. The second device includes at least a sound processing portion for converting a sound into an electric signal and a transmitting circuit that transmits the electric signal to the first device.

In this embodiment, a small-sized battery is provided in each of the first device and the second device, whereby the artificial ear can be reduced in size.

Since artificial ears are often implanted by surgery in childhood, reduction in size is desired.

If reduction in size of an artificial ear is achieved by this embodiment, a protrusion generated in the portion where the artificial car is implanted can be unnoticeably small.

The structure described in this embodiment can be used in appropriate combination with the structure described in any of the other embodiments.

Embodiment 5

In this embodiment, a wearable electronic device will be described.

Figure 7A:
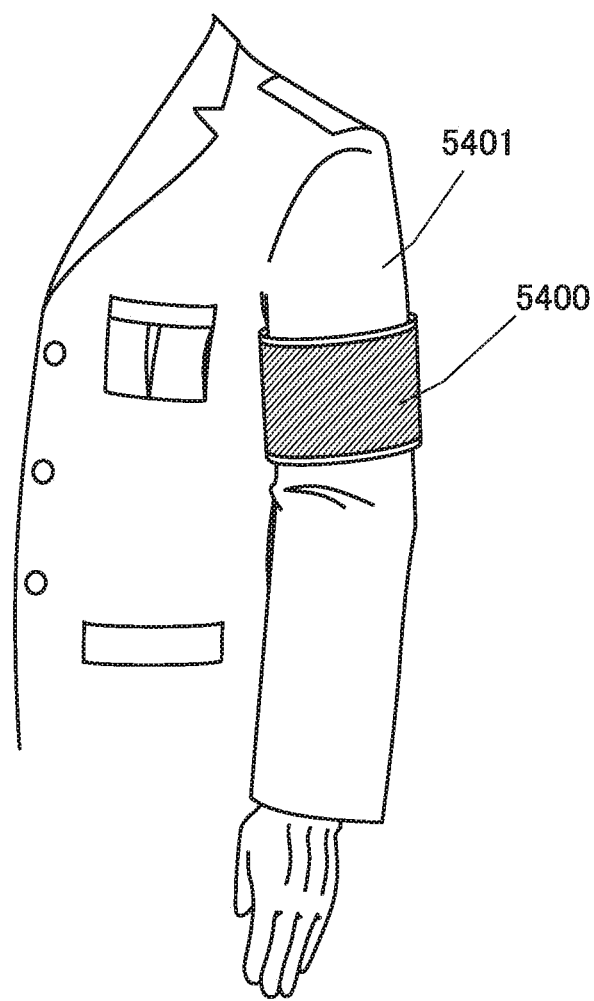
FIGS. 7A and 7B each illustrate an electronic device of one embodiment of the present invention.

In the case where an electronic device with a complex shape is manufactured, a plurality of small-sized batteries are placed in predetermined places as appropriate, whereby the degree of freedom in design of the electronic device can be increased. As shown in FIG. 7A, an electronic device 5400 has a cylindrical form. In order for the electronic device 5400 to be worn on the human body, a plurality of batteries rather than a single battery are appropriately placed, whereby a feeling of the weight can be reduced. Furthermore, if the device has a number of functions, consumption of a battery in a standby state increases; therefore, batteries for the respective functions are prepared. In the case where the electronic device 5400 having a plurality of batteries has a variety of functions, only the function to be used is turned on and electric power is supplied from the battery corresponding to the function, whereby power consumption can be reduced.

The electronic device 5400 is worn on the left upper arm over a clothes 5401, as shown in FIG. 7A. Examples of the clothes 5401 include clothes with sleeves, such as a military uniform, an assault jacket, a suit jacket, a uniform, and space suits. There is no particular limitation on how to wear the electronic device 5400, and examples of ways to wear it include sewing it on a portion of clothes that overlaps with the upper arm, attaching it with a Velcro fastener (registered trademark) or the like provided on a portion of clothes that overlaps with the upper arm, fixing it with a band, a clasp, or the like, and binding a band-like leaf spring around an upper arm.

Figure 7B:
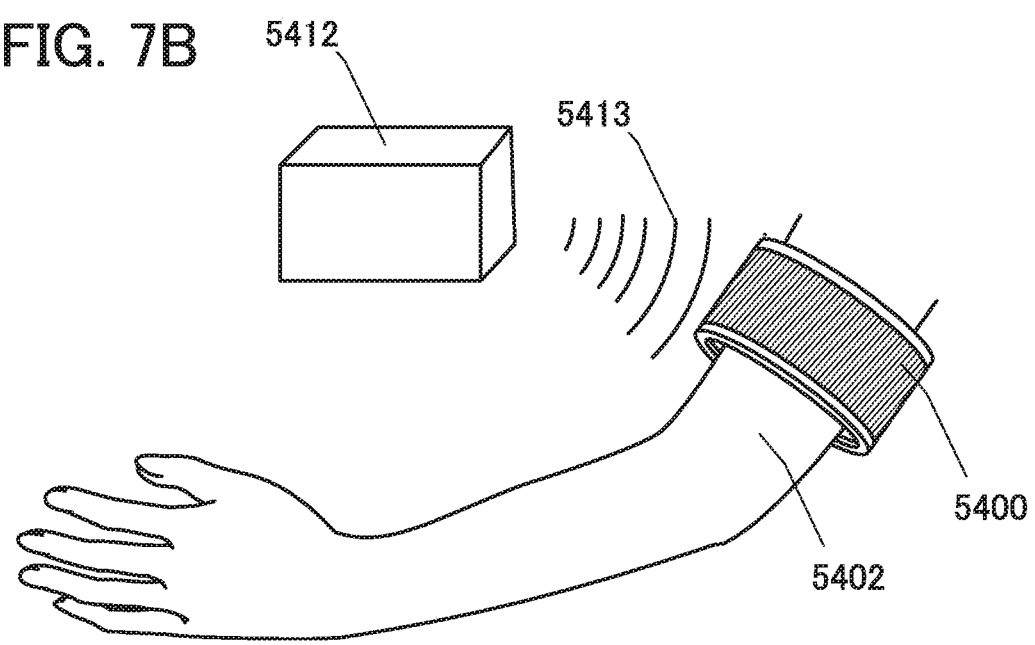

The electronic device 5400 has an antenna. A perspective view in which the electronic device 5400 is worn on the skin and wirelessly charged is shown in FIG. 7B. In FIG. 7B, the electronic device 5400 is worn on an upper arm 5402. A surface of the electronic device 5400 that is to be in contact with the skin is preferably formed using a skin-friendly film or a natural material such as leather, paper, and fabric. The numeral 5412 indicates an electric power transmission device that can wirelessly charge the electronic device 5400 with the use of a radio wave 5413.

When an electronic device is wirelessly charged, the electronic device is not always charged smoothly depending on the positional relation between a charger and the electronic device. Since the electronic device 5400 has a plurality of transmitting and receiving portions, if the positions of the transmitting and receiving portions are scattered, any one of the transmitting and receiving portions can receive electric power regardless of the direction of the electronic device 5400 with respect to the charger. As long as any one of the transmitting and receiving portions can receive electric power and one battery is charged, the other batteries can be wirelessly charged with electric power from the charged one battery, owing to the power supply management circuit. As a result, all the batteries can be fully charged. For a wearable electronic device in particular, capability of being charged while worn on the human body is desired. Thus, it is helpful for a wearable electronic device to have a plurality of batteries and a plurality of transmitting and receiving portions, with the power supply management circuit enabling charging of any of them freely.

When provided with an antenna or a circuit that can transmit and receive other data, the electronic device can transmit and receive other data as well as electric power. For example, the electronic device 5400 can also be used like a smartphone.

The structure described in this embodiment can be used in appropriate combination with the structure described in any of the other embodiments.

Embodiment 6

In this embodiment, an example of a device such as a portable information terminal will be described below.

Figure 8:
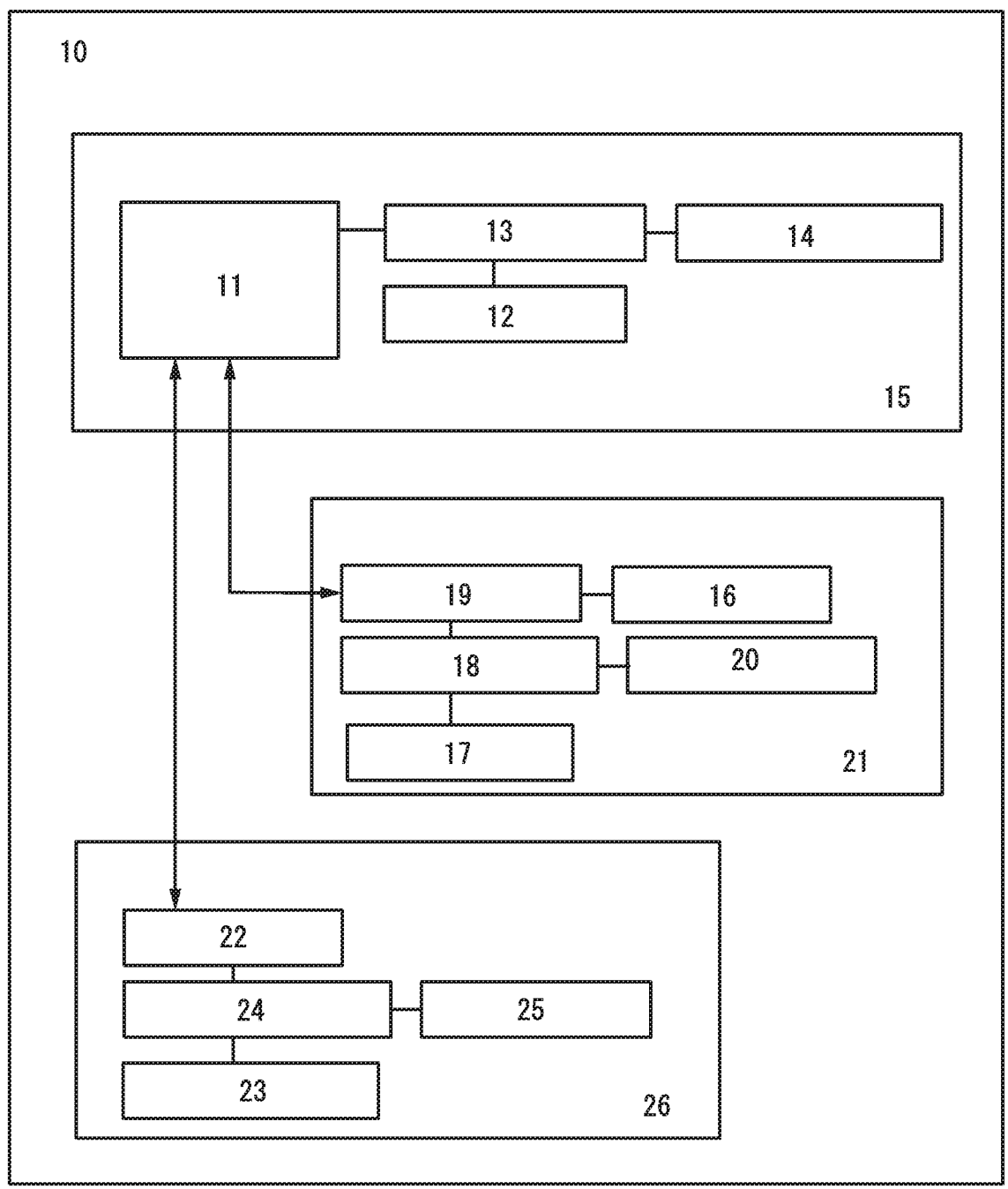
FIG. 8 is a block diagram illustrating one embodiment of the present invention.

FIG. 8 is a block diagram of a device 10.

The device 10 of this embodiment includes a control module 15, a display module 21, and a communication module 26. The control module 15 is a controller that controls the entire device 10, communication, and display of information on a display portion 16.

The control module 15 includes a CPU 11, a battery 12, a regulator 13, and a wireless receiving portion 14.

The display module 21 includes a display portion 16, a display driver circuit 19, a battery 17, a regulator 18, and a wireless receiving portion 20. Although an example in which the device 10 includes the display portion 16 is shown in FIG. 8, this embodiment is not limited thereto, and another functional portion such as a sensor portion can be provided in place of the display portion 16, for example.

The communication module 26 includes a communication circuit 22, a battery 23, a regulator 24, and a wireless receiving portion 25.

Each module includes a regulator and a battery. Each regulator produces electric power or a signal necessary for the respective functional circuit with the use of the electric power of the connected battery, and supplies the electric power or signal to the functional circuit. In addition, the regulator can prevent overcharge and the like when the battery is charged.

In the device 10, each of the modules can be turned on or turned off independently. The operation system that selectively drives only the module to be used can reduce power consumption of the device 10.

For example, when the user looks at information on the display portion 16 without using a communication function, the communication circuit 22 is in an off state where the battery 23 is not used in order that electric power to the communication circuit 22 is blocked in the communication module 26, while the display module 21 and the control module 15 are in an on state.

Furthermore, for a still image, once the still image is displayed on the display portion 16 with the display module 21 and the control module 15 being in an on state, the still image can be kept displayed while only the display module 21 is in an on state even after the control module 15 is turned off with the still image being displayed. Note that when transistors of the display portion 16 use an oxide semiconductor layer with low off-state current (e.g., an oxide material including In, Ga, and Zn), or when the display portion 16 includes a memory for each of the pixels, the still image can be kept displayed for a certain period even when the supply of electric power from the battery 17 is blocked after the still image is displayed.

In this embodiment, an example in which the display module 21, the control module 15, and the communication module 26 each have a battery is described; however, the total number of batteries is not limited to three. The electronic device may additionally include functional modules and their batteries, in which case the electronic device has four or more batteries in total.

Figure 9:
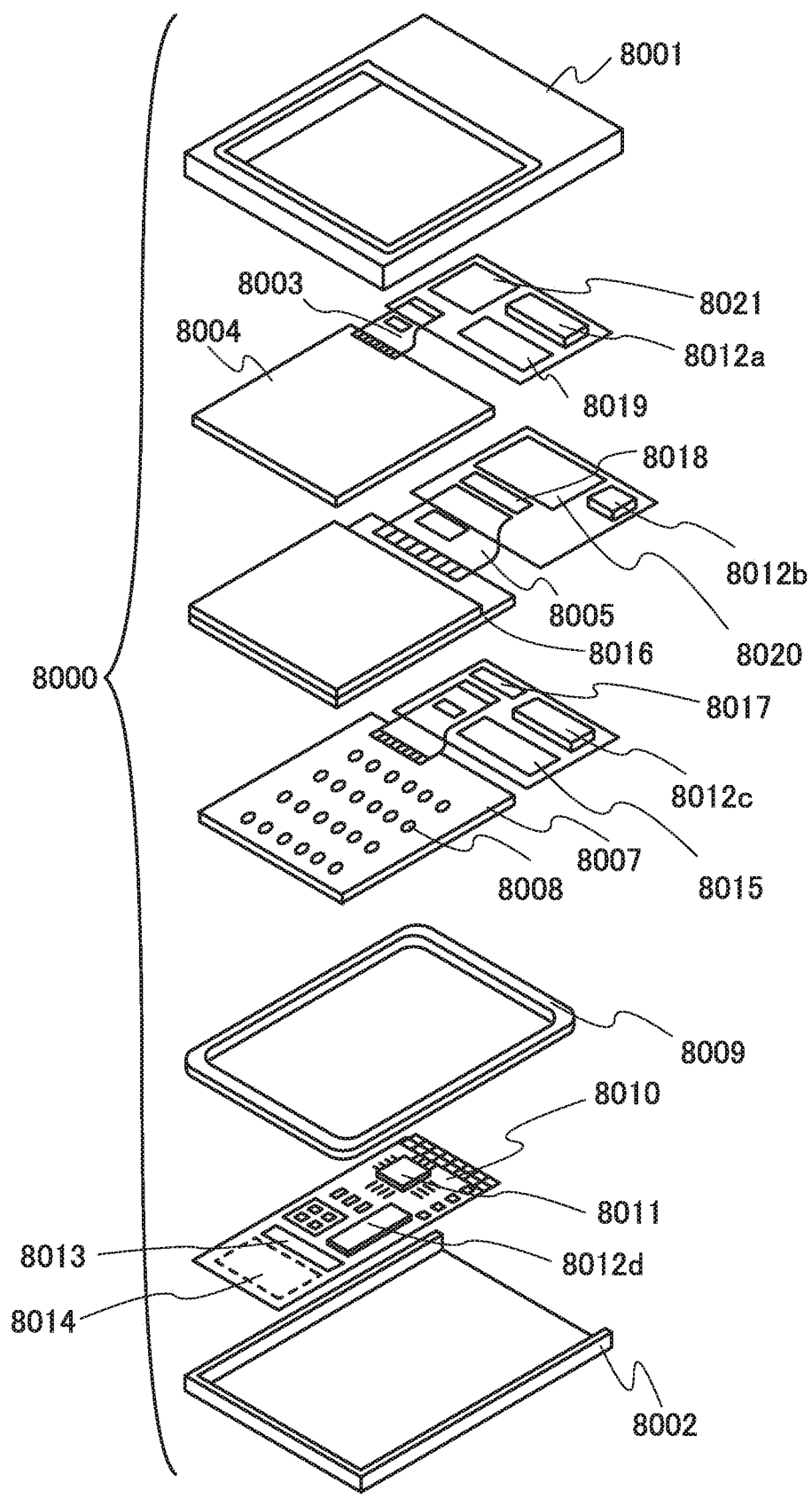
FIG. 9 illustrates an electronic device of one embodiment of the present invention.

As an example of an electronic device, an information terminal including four batteries is shown in FIG. 9.

In an electronic device 8000 illustrated in FIG. 9, a touch panel 8004 connected to an FPC 8003, a display panel 8016 connected to an FPC 8005, a backlight unit 8007, a frame 8009, a printed board 8010, a CPU 8011, and batteries 8012a, 8012b, 8012c, and 8012d are provided between an upper cover 8001 and a lower cover 8002.

The shapes and sizes of the upper cover 8001 and the lower cover 8002 can be changed as appropriate in accordance with the sizes of the touch panel 8004 and the display panel 8016.

The touch panel 8004 can be a resistive touch panel or a capacitive touch panel and may be formed so as to overlap with the display panel 8016. A counter substrate (sealing substrate) of the display panel 8016 can have a touch panel function. A photosensor may be provided in each pixel of the display panel 8016 so that an optical touch panel is obtained. The touch panel 8004 is connected to a printed board via the FPC 8003, and the printed board includes the battery 8012a, a regulator 8021, a receiving portion 8019, and the like. The receiving portion 8019 includes an antenna for wireless charge, and electric power is wirelessly supplied from an external source to the battery 8012a via the regulator, whereby the battery 8012a is charged. The touch panel 8004 is driven mainly with the use of the battery 8012a.

The display panel 8016 is an active matrix liquid crystal display module, and is connected to a printed board via the FPC 8005. The printed board includes the battery 8012b, a regulator 8018, a receiving portion 8020, and the like. The receiving portion 8020 includes an antenna for wireless charge, and electric power is wirelessly supplied from an external source to the battery 8012b via the regulator, whereby the battery 8012b is charged. The display panel 8016 displays an image on a display region mainly with the use of the battery 8012b.

The backlight unit 8007 includes a light source 8008 such as an LED. Furthermore, the backlight unit 8007 is connected to a printed board via an FPC. The printed board includes the battery 8012c, a regulator 8017, a receiving portion 8015, and the like.

Note that although a structure in which the light source 8008 is provided over the backlight unit 8007 is illustrated in FIG. 9, one embodiment of the present invention is not limited to this structure. For example, a structure in which the light source 8008 is provided at an end portion of the backlight unit 8007 and a light diffusion plate is further provided may be employed.

Note that the backlight unit 8007 may not necessarily be provided in the case where the display panel 8016 is a display device using an organic EL element or a reflective liquid crystal display device. The backlight unit 8007 is provided in the case of a transmissive liquid crystal display device or a transflective liquid crystal display device, for example.

Note that as the display panel 8016, a display element, a display device that is a device including a display element, a light-emitting element, a light-emitting device that is a device including a light-emitting element, or the like can employ various modes and can include various elements.

The frame 8009 has a function of protecting the display panel 8016. The frame 8009 can also function as a radiator plate. Furthermore, the frame 8009 may incorporate an antenna of any of the receiving portions.

A control unit includes over the printed board 8010 the CPU 8011, the battery 8012d, a regulator 8013, a receiving portion 8014, and a signal processing circuit for outputting a video signal and a clock signal.

Since the electronic device 8000 is an information terminal, it has a communication module as a communication function. That is, the communication module that realizes a wireless charging function is incorporated. Furthermore, the electronic device 8000 may incorporate a communication module that realizes a near field wireless communication function, which enables a phone call to be made. In that case, the communication module may also include a battery. The electronic device 8000 can include another function such as a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), and a microphone.

One printed board is used for each of the functional circuits, and regulators and batteries are incorporated in order that an optimal power output corresponding to each of the functional circuits is possible. In addition, the distance between the battery and the functional circuit is dose, and a lead wiring can be short, which can reduce power consumption.

Although an example in which one printed board is used for each of the functions and a plurality of printed boards are used in total is shown in FIG. 9, this embodiment is not limited thereto. All the functional circuits may be provided over one printed board, in which case a plurality of batteries are provided over the one printed board. A plurality of functions may be provided over one printed board, and at that time, a single battery instead of a plurality of batteries may be provided. Each of the display panel 8016, the touch panel 8004, and the backlight unit 8007 in FIG. 9 is electrically connected to the control unit via a wiring cord or an FPC not shown in FIG. 9.

Furthermore, the electronic device 8000 may further be provided with a slot for insertion of a SIM card, a connector portion for connecting a USB device such as a USB memory.

As described above, a battery is provided for each of the units (modules or functions) to be used in the electronic device 8000, i.e., the electronic device 8000 has a plurality of power supplies. The electronic device 8000 having a plurality of power supplies is provided with the operation system that selectively drives only the function to be used, whereby power consumption can be reduced.

Furthermore, each of the batteries is provided with a communication module that realizes a wireless charging function, and charging of the plurality of batteries at a time can be performed.

Although an example in which the electronic device 8000 has a box-like shape is described in this embodiment, one embodiment of the invention is not limited thereto. The electronic device may have a complex shape. In the case where an electronic device with a complex shape is manufactured, a plurality of small-sized batteries are placed in predetermined places as appropriate; whereby the degree of freedom in design of the electronic device can be increased.

The structure described in this embodiment can be used in appropriate combination with the structure described in any of the other embodiments.

This application is based on Japanese Patent Application serial no. 2014-017682 filed with Japan Patent Office on Jan. 31, 2014 and Japanese Patent Application serial no. 2014-017776 filed with Japan Patent Office on Jan. 31, 2014, the entire contents of which are hereby incorporated by reference.

What is claimed is:

1. An electronic device comprising:
   a display module comprising a display portion and a display driver circuit;
   a communication module comprising a communication circuit;
   a first wireless receiving portion;
   a second wireless receiving portion; and
   a battery configured to be charged from an external source through at least one of the first wireless receiving portion and the second wireless receiving portion,
   wherein the display portion includes a transistor including an oxide semiconductor in a channel formation region,
   wherein each of the display module and the communication module is configured to be able to be turned on or turned off independently.

2. The electronic device according to claim 1, wherein the electronic device is flexible.

3. The electronic device according to claim 1, wherein the transistor is a double-gate type.

4. The electronic device according to claim 1, wherein at least one of the first wireless receiving portion and the second wireless receiving portion includes an antenna.

5. The electronic device according to claim 1, wherein the electronic device is a mobile computer.

6. An electronic device comprising:
   a display module comprising a display portion and a display driver circuit;
   a communication module comprising a communication circuit;
   a control module comprising a CPU;
   a first wireless receiving portion;
   a second wireless receiving portion; and
   a battery configured to be charged from an external source through at least one of the first wireless receiving portion and the second wireless receiving portion,
   wherein the display portion includes a transistor including an oxide semiconductor in a channel formation region,
   wherein each of the display module and the communication module is configured to be able to be turned on or turned off independently.

7. The electronic device according to claim 6, wherein the electronic device is flexible.

8. The electronic device according to claim 6, wherein the transistor is a double-gate type.

9. The electronic device according to claim 6, wherein at least one of the first wireless receiving portion and the second wireless receiving portion includes an antenna.

10. The electronic device according to claim 6, wherein the electronic device is a mobile computer.

* * * * *